United States Patent
Lacaux et al.

(10) Patent No.: US 12,028,009 B2
(45) Date of Patent: Jul. 2, 2024

(54) PROTECTION SYSTEM FOR AIRCRAFT ELECTRIC PROPULSION MOTOR AND MOTOR CONTROLLER

(71) Applicant: The Boeing Company, Chicago, IL (US)

(72) Inventors: Frederic Lacaux, Woodinville, WA (US); Eugene V. Solodovnik, Lake Stevens, WA (US); Vyacheslav Khozikov, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 482 days.

(21) Appl. No.: 17/372,349

(22) Filed: Jul. 9, 2021

(65) Prior Publication Data

US 2022/0094297 A1 Mar. 24, 2022

Related U.S. Application Data

(60) Provisional application No. 63/080,723, filed on Sep. 20, 2020.

(51) Int. Cl.
| | |
|---|---|
| *H02P 1/00* | (2006.01) |
| *B60L 15/20* | (2006.01) |
| *B60L 50/60* | (2019.01) |
| *B64C 11/30* | (2006.01) |
| *B64D 27/24* | (2006.01) |
| *B64D 31/00* | (2006.01) |

(Continued)

(52) U.S. Cl.
CPC .......... *H02P 29/028* (2013.01); *B60L 15/20* (2013.01); *B60L 50/60* (2019.02); *B64C 11/303* (2013.01);

(Continued)

(58) Field of Classification Search
CPC .......... H02P 29/028; H02P 27/06; H02P 3/22; H02P 29/024; B60L 50/60; B60L 15/20;
(Continued)

(56) References Cited

U.S. PATENT DOCUMENTS

| | | |
|---|---|---|
| 8,760,094 B2 | 6/2014 | Solodovnik et al. |
| 2015/0286515 A1 | 10/2015 | Monk |

(Continued)

FOREIGN PATENT DOCUMENTS

| | | | | |
|---|---|---|---|---|
| CN | 111216904 A | * | 6/2020 | ............ B64C 11/30 |
| CN | 113572380 A | * | 10/2021 | ............ B64C 13/00 |

(Continued)

OTHER PUBLICATIONS

Extended European Search Report dated Feb. 8, 2022, in European Patent Application No. 21195845.9 (European counterpart of the instant patent application).

(Continued)

*Primary Examiner* — Karen Masih
(74) *Attorney, Agent, or Firm* — Ostrager Chong Flaherty & Broitman P.C.

(57) ABSTRACT

A method for protecting an electric propulsion system in response to occurrence of a fault. The method includes the step of activating short circuits in power switches of inverters in a motor controller to redirect current regenerated by a motor which is electrically coupled to the motor controller and mechanically coupled to a propeller. The method further includes feathering the propeller while the motor is regenerating current. The protection logic is designed to address different types of faults, including faults in the high-voltage direct-current bus, faults in the motor controller, and faults in the motor.

20 Claims, 23 Drawing Sheets

(51) Int. Cl.
  *H02P 27/06*   (2006.01)
  *H02P 29/028*  (2016.01)
(52) U.S. Cl.
  CPC ............ *B64D 27/24* (2013.01); *B64D 31/00* (2013.01); *H02P 27/06* (2013.01); *B60L 2200/10* (2013.01)
(58) Field of Classification Search
  CPC ... B60L 2200/10; B64C 11/303; B64D 27/24; B64D 31/00
  See application file for complete search history.

(56) References Cited

U.S. PATENT DOCUMENTS

| | | |
|---|---|---|
| 2015/0311832 A1 | 10/2015 | Solodovnik et al. |
| 2017/0279287 A1 | 9/2017 | Solodovnik et al. |
| 2020/0290742 A1 | 9/2020 | Kumar et al. |

FOREIGN PATENT DOCUMENTS

| | | |
|---|---|---|
| EP | 3650352 A1 | 5/2020 |
| JP | 2016201860 A | 12/2016 |
| WO | 2017186436 A1 | 11/2017 |

OTHER PUBLICATIONS

Canadian Office Action dated Jan. 17, 2024, in Canadian Patent Application No. 3,129,793 (Canadian counterpart to the instant patent application).

\* cited by examiner

PROTECTION SYSTEM FOR AIRCRAFT ELECTRIC PROPULSION MOTOR AND MOTOR CONTROLLER

BACKGROUND

The present disclosure generally relates to electrical power conversion systems and, in particular, to power conversion systems for converting direct current (DC) into alternating current (AC). In particular, the present disclosure relates to methods and apparatus for converting DC power into AC power in an aircraft electric propulsion system.

Aircraft having electrically powered propulsion systems (hereinafter "electric aircraft") are equipped with electric motors which convert electrical power into mechanical power. For example, an electric motor may turn one or more propellers on the aircraft to provide thrust. More specifically, the electric motor has loops of wire (hereinafter "stator windings") in a magnetic field. When current is passed through the stator wings, the magnetic field exerts torque on a rotor, which rotates a shaft. Electrical energy is converted to mechanical work in the process.

An electric aircraft may take various forms. For example, the electric aircraft may be an aircraft, a rotorcraft, a helicopter, a quadcopter, an unmanned aerial vehicle, or some other suitable type of aircraft. For electric aircraft, the batteries are large and designed to provide a large amount of power for the purpose of propulsion. In one implementation, the battery is connected to a high-voltage direct-current (HVDC) bus, which is also supplied by the generator source(s). As used in the aerospace industry and herein, the term "high voltage" in the context of direct current means any DC voltage higher than 500 $V_{DC}$. Such DC high voltage is typically derived from rectification of three-phase 230 $V_{AC}$ power.

In all-electric or hybrid electric propulsion systems for aircraft, large electric motors are used to provide thrust to aircraft. The permanent magnet electric motors are chosen for electric propulsion because they are simple in construction, run more efficiently than other motor types, and typically have lower weight compared to other motor types. The PM electric motors are driven by a motor controller. The function of the motor controller is to convert HVDC battery power to variable frequency/variable magnitude at least three-phase AC power needed to drive the electric propulsion motor. Another critical function of the motor controller is to protect the system against failure conditions. Failure conditions in hybrid or hybrid electric propulsion systems can result in high-current and high-energy conditions which are undesirable.

State-of-the-art protection architectures have been developed in the past for airplanes that utilize high-power motor controllers and motors. However, the nature of the loads, power levels, criticality of the loads, grounding schemes, etc. are very different from the hybrid electric propulsion application. The power levels are lower: 100 kW for the largest motor controller load versus. 500 kW to 1000 kW for electric propulsion loads. This results in higher fault energy levels. In one such airplane, none of the high power motors and motor controller loads perform airplane propulsion functions. Most of the functions involved the environmental control system, electric motor pump, engine start, auxiliary power unit start, and ram fan. None of the functions were critical. It was acceptable to lose one or two motor loads without any safety implications. In addition, the grounding scheme is different from what is being implemented for electric propulsion. The grounding scheme impacts how and how fast failure can be detected and the type of sensors that are used for detection. Different types of motor load can impact the direction in which power flows after the failure, therefore post-fault logic needs to be implemented. Different types of motors in previous systems (induction or wound rotor machines versus large permanent magnet) impact protection and its logic. Lastly, the number of motor controllers that drive one motor and number of motor phases also affect protection logic. In a typical non-electric propulsion application, a single motor controller drives a single three-phase motor. For electric propulsion, due to high power levels, motors are often made multi-phase (12, 18, etc.). Therefore, multiple motor controllers are driving a single motor. This also affects protection logic and its coordination among the motor controllers.

SUMMARY

The subject matter disclosed in some detail below is directed to a fault-tolerant power system architecture for aircraft electric propulsion. More specifically, systems and methods for protecting an airplane electric propulsion motor drive system are disclosed. The architecture proposed herein also meets high-power propulsive requirements for aircraft and aerospace requirements for system controllability and availability. The fault-tolerant systems disclosed herein continue to operate in the event of the failure of (or one or more faults within) some component. The ability to maintain functionality when portions of the system break down is referred to herein as "degradation". A fault-tolerant design enables a system to continue its intended operation, possibly at a reduced level, rather than failing completely, when some part of the system fails.

The aircraft electric propulsion motor drive systems disclosed herein include a motor controller that converts direct current (DC) from a battery into alternating current (AC) for powering one or more electric motors. The motor controller includes multiple sets of inverters and respective inverter controllers which control the switch states of the inverter power switches. The motor controller receives DC power from a battery (or battery system including multiple battery modules) via a HVDC bus. In a situation when a fault has occurred on the HVDC bus, not only the battery feeds the fault, but also the motor feeds the fault through the motor controller.

When a fault on the HVDC bus is detected, a protection circuit cuts off power to the motor by issuing a command that causes an upstream contactor with high-voltage DC bus input to open (as disclosed in U.S. Pat. No. 11,128,251). However, even if the battery is disconnected after the fault, the spinning motor regenerates current which is fed to the fault through the motor controller. Even if all switches in the motor controller are open, the motor controller freewheeling diodes are still connected; the diodes act as a rectifier and allow for the regenerative power from the spinning motor to feed the fault. Since the motor is a large motor used for propulsion, the regenerated currents can be very large, reaching thousands of amperes. The air forces that continue to spin the propeller and motor are large and will continue to spin the motor until the propeller is feathered (meaning that the pitch of the propeller blades is adjusted so that they are almost parallel to the airstream) by the propeller pitch controller (hereinafter "governor"). Feathering the propeller can take approximately 10 seconds. Feeding the fault with thousands of amperes for approximately 10 seconds introduces excessive energy into the airplane structure having possibly undesirable consequences. It is desirable to limit airplane structure exposure to high-energy failure.

For faults on the HVDC bus in a fault-tolerant architecture, it may be beneficial to continue degraded electric propulsion motor operation rather than command complete system shutdown; safe operation under such failure condition is still possible. It is also possible to use a second healthy channel for controlled system shutdown, allowing for extended (seconds or minutes) operation of the electric propulsion system under a failure condition for an architecture having redundant channels.

In accordance with the innovative technology proposed herein, the motor controller switches are subjected to an active short circuit (ASC) after a HVDC bus fault occurs. Short circuiting the motor controller switches has the effect of redirecting regenerated current to the motor controller instead of the fault. The regenerated current will circulate between the electric propulsion motor and the motor controller. The ASC of the motor controller can be commanded very quickly, within milliseconds. The electric propulsion motor and motor controller are still actively cooled by liquid; therefore, the heating effect of the short circuit current circulating between the motor and motor controller is actively managed by a cooling system. After the fault and after ASC has been commanded, the propeller pitch controller (governor) feathers the propeller in a well-known manner over the course of a typical interval of time. After the propeller has been feathered, the air forces on the propeller that make the motor spin are greatly reduced. The motor stops spinning and, therefore, stops regenerating power. When power regeneration is stopped, the motor controller switches may optionally be commanded from the ASC state back to the Open state.

Other possible failures that can create high current/high energy conditions are as follows: a power switch fails short, phase-to-phase or three phase shorts in the feeders between the motor controller and the motor, and a motor turn-to-turn short circuit. Shoot-through can happen when a short circuit is detected between positive and negative rails with a large short-circuit current flowing through upper and lower power devices in an inverter. This disclosure also proposes protection logic for protecting the system when a fault occurs in the motor or motor controller.

Although various embodiments of systems and methods for protecting an airplane electric propulsion motor drive system will be described in some detail below, one or more of those embodiments may be characterized by one or more of the following aspects.

One aspect of the subject matter disclosed in detail below is a method for protecting an electric propulsion system in response to occurrence of a fault, the method comprising: activating short circuits in power switches of inverters in a motor controller to redirect current regenerated by a motor which is electrically coupled to the motor controller and mechanically coupled to a propeller; and feathering the propeller while the motor is regenerating current.

Another aspect of the subject matter disclosed in detail below is an electric propulsion unit comprising: a battery; a DC bus connected to receive DC power from the battery; a motor controller connected to receive DC power from the DC bus, the motor controller comprising a plurality of inverters; an AC motor connected to receive AC power from the motor controller; a propeller mechanically coupled to the AC motor, the propeller comprising propeller blades having adjustable pitch; a governor configured to adjust the pitch of the propeller blades during a feathering operation; and a control system configured to perform operations comprising: activating short circuits in power switches of the inverters in the motor controller to redirect current regenerated by the AC motor; and activating the governor to feather the propeller while the motor is regenerating current.

A further aspect of the subject matter disclosed in detail below is a method for staged controlled shutdown of a motor controller that includes a plurality of inverters, the method comprising: (a) closing power switches in one row of power switches in each inverter of the motor controller; (b) opening battery contactors to disconnect a battery from the motor controller; (c) discharging a DC link capacitor in each inverter of the motor controller; and (d) closing all open power switches in the motor controller after the DC link capacitors have been discharged.

Yet another aspect is a method for protecting an electric propulsion system in response to a power switch open fault, the method comprising: (a) detecting the power switch open fault in one row in an inverter of a motor controller; (b) determining whether the power switch open fault occurred during a field weakening operation or not; and (c) taking protective action in dependence on the determination made in step (b). Step (c) comprises opening other power switches in the inverter if the power switch open fault did not occur during a field weakening operation. If the power switch open fault occurred during a field weakening operation, then step (c) comprises: closing power switches in another row of the inverter; opening battery contactors to disconnect a battery from the motor controller; discharging a DC link capacitor in the inverter; and closing all healthy power switches in the one row after the DC link capacitor has been discharged.

A further aspect is an electric propulsion unit comprising a control system configured to perform the operations described in the immediately preceding paragraph Other aspects of systems and methods for protecting an airplane electric propulsion motor drive system are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

FIG. 17 is a flowchart showing the protection logic sequence used by the protection system depicted in FIG. 16 for staged controlled shutdown of an electric propulsion unit in response to a turn-to-turn fault in a stator winding.

FIG. 21 is a flowchart showing the protection logic sequence used by the protection system depicted in FIG. 20 for staged controlled shutdown of an electric propulsion unit in response to a turn-to-turn fault in a stator winding.

Reference will hereinafter be made to the drawings in which similar elements in different drawings bear the same reference numerals.

DETAILED DESCRIPTION

Figure 1:
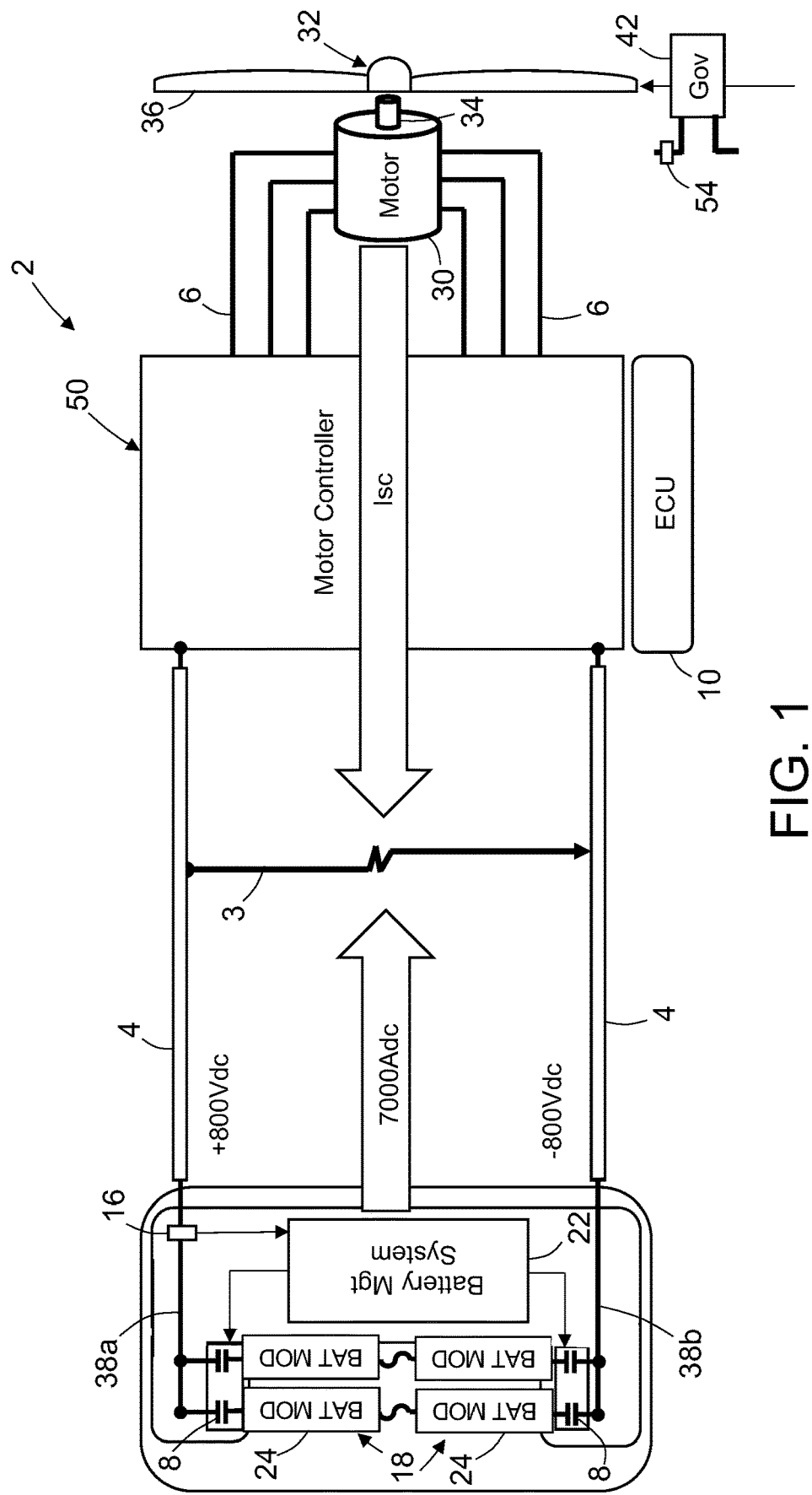
FIG. 1 is a diagram showing a fault on an HVDC bus and power flow for an aerospace electric propulsion system comprising a DC-to-AC converter that receives DC power from a battery system via the HVDC bus.

Illustrative embodiments of systems and methods for protecting an airplane electric propulsion motor drive system are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The airplane electric propulsion motor drive systems disclosed herein include an electric motor that drives rotation of the propeller, one or more motor controllers that are configured to convert direct current (DC) into alternating current (AC), and a DC power source (e.g., a battery system). The DC power source may include, for example, a DC-to-DC converter for increasing, or stepping-up, the voltage level of a low-voltage DC power source to form a high-voltage DC (HVDC) power source. As used herein, a DC-to-DC converter is an electrical or electromechanical device used to change the voltage level of the DC current power source. The high-voltage DC current power may then be fed to one or more inverters of the motor controller to form a high-voltage AC power source.

An inverter is a power electronic device or circuit that changes direct current to alternating current. In one simple inverter circuit, DC power is connected to a transformer through the center tap of the primary winding. A switch is switched rapidly back and forth to allow current to flow back to the DC source following two alternate paths through one end of the primary winding and then the other end. The alternation of the direction of current in the primary winding of the transformer produces alternating current in the secondary circuit. In accordance with one proposed implementation, each inverter includes a switch system, a set of inductors, a set of capacitors, and an electromagnetic interference filter. The switch system may include different numbers of switches (hereinafter "power switches"), depending on the type of inverter. Each of the power switches may be implemented using, for example, without limitation, a bipolar transistor device, a metal-oxide semiconductor field-effect transistor (MOSFET) device, an insulated-gate bipolar transistor device, or some other type of semiconductor device or switching device.

Inverters may take various forms, including, but not limited to, single-phase inverters and three-phase inverters. Three-phase inverters (hereinafter "3-phase inverters) are used for variable-frequency drive applications and/or for high-power applications such as AC power transmission. A basic 3-phase inverter consists of three single-phase inverters, each of which consists of two switches in series with the center point connected to one of the three load terminals. For the most basic control scheme, the operation of the six switches of the three phase legs is coordinated so that one switch operates at each 60 degree point of the fundamental output waveform. This creates a line-to-line output waveform that has six steps. The six-step waveform has a zero-voltage step between the positive and negative sections of the square wave such that the harmonics that are multiples of three are eliminated. When carrier-based PWM techniques are applied to six-step waveforms, the basic overall shape, or envelope, of the waveform is retained so that the third harmonic and its multiples are cancelled. To construct inverters with higher power ratings, two six-step 3-phase inverters can be connected in parallel for a higher current rating or in series for a higher voltage rating. In either case, the output waveforms are phase shifted to obtain a 12-step waveform. If additional inverters are combined, an 18-step inverter is obtained with three inverters etc. Although inverters are usually combined for the purpose of achieving increased voltage or current ratings, the quality of the waveform is improved as well.

FIG. 1 is a block diagram identifying components of a typical aerospace electric propulsion system architecture with a single propulsor 2. The propulsor 2 is formed in part by a motor controller 50 that converts DC power to AC power. Thus, the term "motor controller" as used herein includes a DC-to-AC converter (not shown in FIG. 1). The propulsor 2 further includes an AC motor 30 that receives AC power from motor controller 50 via pluralities or sets of AC power lines 6. The propulsor 2 further includes a propeller 32 which is driven to rotate by the AC motor 30. The propeller 32 includes a propeller shaft 34 which is mechanically coupled to the output shaft (not shown in FIG. 1) of the AC motor 30 and a plurality of propeller blades 36. The propulsor 2 further includes a governor 42 which is configured to maintain a constant speed of rotation of the propeller 32 by varying the pitch of the propeller blades 36. Hydraulic governors accomplish this by using a hydraulic valve 54 to control the flow of engine oil through hydraulic mechanisms in the propeller 32.

In some implementations, the motor controller 50 has multiple channels for providing AC current to respective sets of stator windings in the AC motor 30. Each channel of the motor controller 50 comprises a respective inverter (not shown in FIG. 1) having a set of power switches and an inverter controller (not shown in FIG. 1) which controls the states of the power switches. The power switches are connected to the stator windings of AC motor 30. The motor controller 50 further includes a multiplicity of pairs of sensors (not shown in FIG. 1) which measure the voltages and currents of the AC power signals output by the inverters, which sensor data is fed back to the respective inverter controllers. The operation of inverters is controlled by the inverter controllers, which send switch control signals to and receive switch state signals from the inverters via switch signal lines (not shown in FIG. 1). The inverters of the motor controller 50 convert DC power into multi-phase AC power for the AC motor 30. The inverters and inverter controllers, in combination, form a DC-to-AC converter which is part of the motor controller 50. More specifically, the inverter controller generates pulse width-modulated signals that serve as reference currents and voltages that need to be sourced to the motor 30 in order to achieve optimal mechanical torque output. These reference signals are modulated using a PWM generation function which creates commands which are sent to the gate drivers of the power switches in the inverter controlled by the inverter controller.

In the system depicted in FIG. 1, the HVDC power source is a battery 18. For example, the battery 18 may include a multiplicity of battery modules 24 arranged to form a battery pack. In the example implementation depicted in FIG. 1, the battery 18 includes a multiplicity of battery strings connected in parallel via respective contactors 8 to positive and negative DC busbars 38a and 38b. The DC current flowing through positive DC busbar 38a is measured by a current sensor 16. Each battery string includes a plurality of battery modules 24 connected in series. The DC current flowing through each battery string is measured by a respective current sensor (not shown in FIG. 1). Each battery module 24 is a parallel/series arrangement of individual cells (not shown in FIG. 1). Each battery module 24 may be monitored by an associated module monitoring unit (not shown in FIG. 1). Each module monitoring unit includes sensors for independently measuring virtual cell voltage and individual cell temperature. The module monitoring unit also includes balancing circuits.

The system further includes a DC voltage conversion system (not shown in FIG. 1) that is configured to receive low-voltage DC power from battery 18 and convert that low-voltage DC power to high-voltage DC power. The system depicted in FIG. 1 further includes a HVDC bus 4 that is connected to carry high-voltage DC power from the DC voltage conversion system to the motor controller 50. For example, the HVDC bus 4 may include a pair of HVDC busbars respectively connected to receive HVDC power from the DC voltage conversion system.

The DC voltage conversion system (not shown in the drawings) comprises a voltage converter and a converter controller. The converter controller generates control signals according to specific switching modulation algorithms, for example, pulse width modulation, phase shift modulation, and interleaved modulation, or a combination of two or three, etc. The voltage converter is controlled by the converter controller using one of the aforementioned specific modulation methods to convert an input current at an input voltage to an output current at an output voltage while achieving specific electric performance requirements, for example, in terms of efficiency improvement, current ripple reduction, noise minimization, etc.

The system depicted in FIG. 1 also includes a battery management system 22. The operation of battery 18 is managed by battery management system 22. Each module monitoring unit incorporated in the battery 18 communicates sensor data representing virtual cell voltage and individual cell temperature to the battery management system 22. The battery management system 22 also receives data from current sensor 16. The battery management system 22 may be configured to ensure redundant protections, fail-safe operation, and selective shutdown of battery strings. The battery management system 22 may be further configured to provide battery overcharge protection or to forestall other events or combination of events that could lead to battery thermal runaway. More specifically, the switching states of selected contactors 8 may be controlled by battery management system 22 to open in response to detection of a fault condition (e.g., a short circuit) in one of the battery strings.

As seen in FIG. 1, the system further includes an engine control unit 10 (ECU). The engine control unit 10 interfaces with the inverter controllers (not shown in FIG. 1) inside the motor controller 50. The inverter controllers of motor controller 50 are communicatively coupled to receive control signals from engine control unit 10 and send feedback signals to engine control unit 10. The engine control unit 10 performs a role of supervision and coordination for all inverter controllers. As will be described in some detail below, the engine control unit 10 is communicatively coupled to an electric propulsion controller (not shown in FIG. 1) which controls the overall operation of the airplane electric propulsion motor drive system depicted in FIG. 1.

FIG. 1 depicts a situation in which a fault 3 (e.g., a short circuit) has occurred on an HVDC bus 4. In this example, the HVDC bus 4 may supply a nominal voltage of 1000-1600 $V_{DC}$ and carry a nominal current of 1000 $A_{DC}$. In the event of such a fault, the battery 18 can supply a large fault current (indicated by the rightward-pointing arrow) that can be as high as 7000 $A_{DC}$. As previously mentioned, not only does the battery 18 feed the fault, but also the AC motor 30 feeds the fault through the motor controller 50. For example, a short circuit current $I_{SC}$=7000 $A_{DC}$ may be regenerated by the AC motor 30 (indicated by a leftward-pointing arrow).

Figure 2:
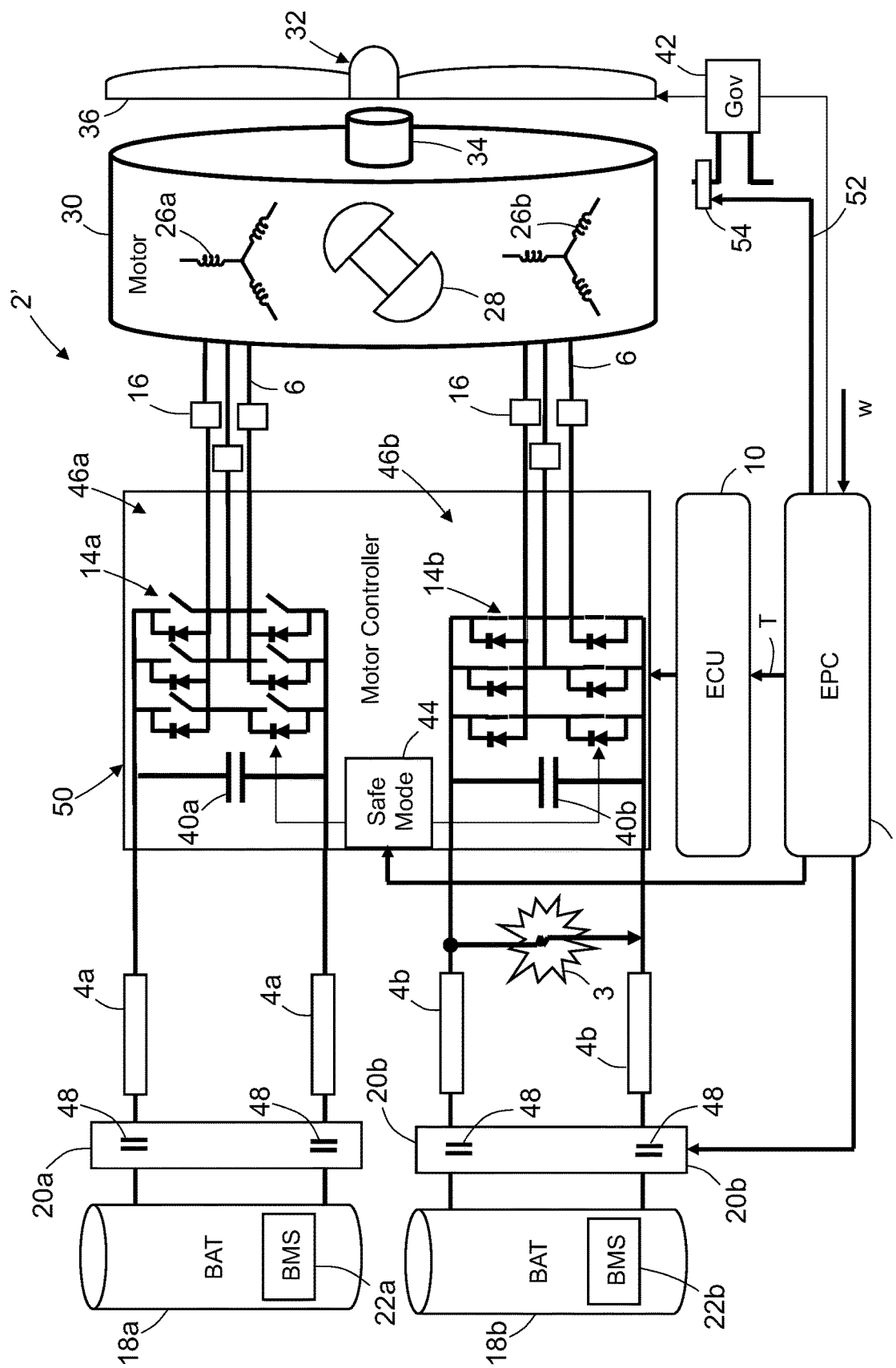
FIG. 2 is a diagram showing a fault on one HVDC bus of an aerospace electric propulsion system having a motor controller with two channels and also showing the state of the power switches in the faulty channel when the safe mode is invoked in response to the fault.

FIG. 2 is a diagram showing a propulsor 2' in which the motor controller 50 has two channels 46a and 46b. Channel 46a receives DC power generated by a first battery 18a via a first power distribution board 20a and a first HVDC bus 4a, whereas channel 46b receives DC power generated by a second battery 18b via a second power distribution board 20b and a second HVDC bus 4b. The first and second batteries 18a and 18b are managed and protected by respective battery management systems 22a and 22b. Each of the first and second power distribution boards 20a and 20b includes a respective pair of battery contactors 48 which, when closed, connect the first and second batteries 18a and 18b to the first and second HVDC buses 4a and 4b respectively, and which, when open, disconnect the first and second batteries 18a and 18b from the first and second HVDC buses 4a and 4b respectively. One channel of motor controller 50 may be disabled in the event of a fault, while the other channel continues to operate. Such a configuration is referred to herein as a degraded mode of operation for the electric propulsion system.

In the example depicted in FIG. 2, the AC motor 30 is a 2×3-phase AC motor. As seen in FIG. 2, the AC motor 30 receives AC power from channels 46a and 46b via AC power lines 6. Respective current sensors 16 measure the current flowing through the AC power lines 6. The AC motor 30 includes a rotor 28 and a stator separated from the rotor 28 by an air gap. The exemplary stator includes respective sets of star-connected 3-phase stator windings 26a and 26b which receive AC power from respective inverters. The rotor 28 has a multiplicity of windings (not shown in the drawings) or a permanent magnet array, which windings or permanent magnet array interact with the magnetic field produced by the stator windings to generate the forces that turn the propeller shaft 34. The AC motor 30 further includes an angular speed and position sensor (not shown in FIG. 2) which detects the electrical frequency and angular position of the rotor 28 and outputs an angular velocity signal w and a position signal to the control system. The angular velocity signal w is proportional to the mechanical speed of rotation of the motor (which is also the speed of the propeller). The position signal represents the angular position of the rotor 28.

The electric motors for propulsion may be permanent magnet motors. Permanent magnet motors have the advantages of high power density, high efficiency, and low weight. Maintaining low weight for electric aircraft is important. Therefore, high-power-density components are used in the system. However, permanent magnet motors have certain undesirable failure modes that require special procedures and carefully designed failure isolation. One disadvantage of permanent magnet motors during failures is that motor magnetic excitation cannot be removed because field excitation is created by the permanent magnets, which are always present as part of the motor. For example, if there is a turn-to-turn short in the motor windings, it is not sufficient to remove power from the motor by turning off the motor controller. Because the motor still spins and because field excitation is still present due to spinning magnets, electric current will still be generated in the motor winding with the short circuit and will continue to feed the fault. The fault-tolerant system proposed herein overcomes the foregoing difficulty by taking special actions in response to fault detection.

In the simplified implementation depicted in FIG. 2, channel 46a includes a first inverter 14a (including three pairs of power switches respectively associated with three phases) and a DC link capacitor 40a, whereas channel 46b includes a second inverter 14b (also including three pairs of power switches) and a DC link capacitor 40b. The first and second inverters 14a and 14b are connected to provide 3-phase AC power to respective sets of star-connected stator windings 26a and 26b. The states of the power switches in inverters 14a and 14b are controlled by respective inverter controllers (not shown in FIG. 2). The inverter controllers are communicatively coupled to the engine control unit 10. For example, the states of power switches of inverters 14a and 14b may be controlled to provide 6-phase AC power to the AC motor 30 during normal operation. However, FIG. 2 depicts a situation in which channel 46a of motor controller 50 is operating normally, while channel 46b is not operating normally, but rather has been placed in a state where all of the power switches in inverter 14b are closed for reasons explained below.

Figure 4:
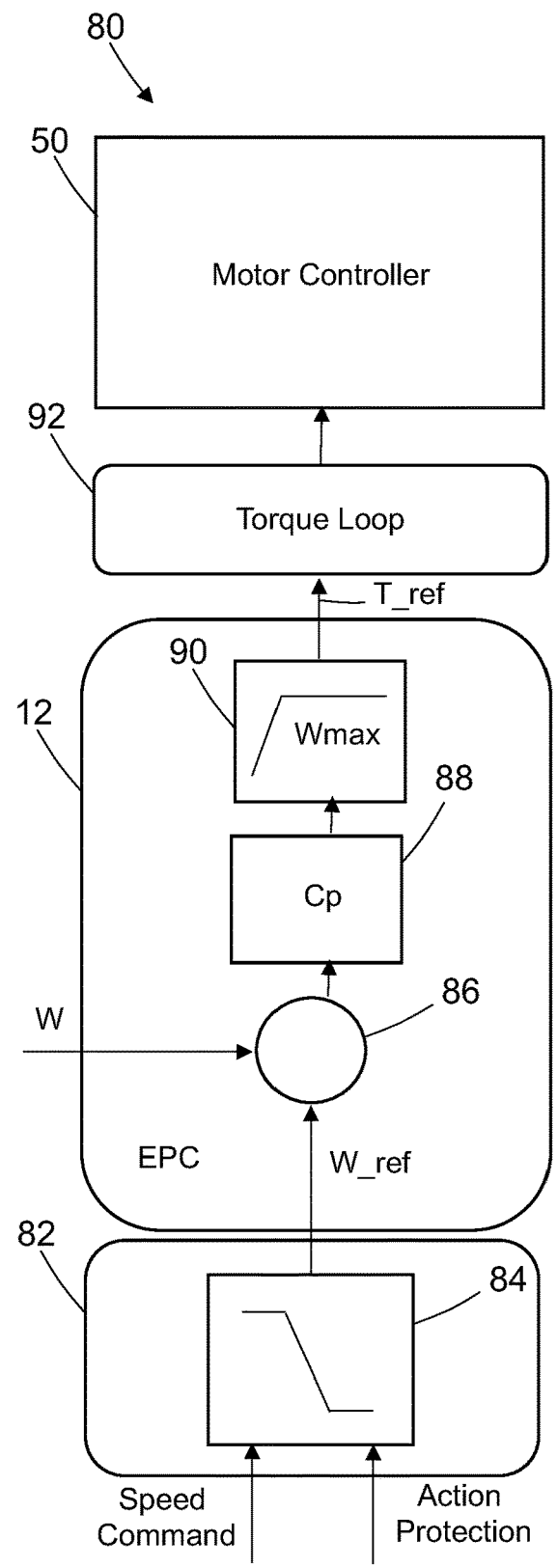
FIG. 4 is a flowchart identifying steps of an algorithm for controlling the rotational speed of the propeller in accordance with one proposed implementation.

As seen in FIG. 2, the electric propulsion system further includes an electric propulsion controller 12 which receives pilot thrust and pitch inputs from a thrust control lever and a pitch control lever (not shown in FIG. 2, but see thrust control lever 21 and pitch control lever 23 in FIG. 4). The electric propulsion controller 12 receives a signal w which is proportional to the speed of propeller rotation from the speed and position sensor. The electric propulsion controller 12 also receives signals representing measured currents from the current sensors 16. The electric propulsion controller 12 sends instructions to the engine control unit 10 for controlling operation of the inverters based on information from sensors and pilot inputs. The electric propulsion controller 12 also interfaces with the battery management systems 22a and 22b. The electric propulsion controller 12 is configured to send digital torque command signals to the engine control unit 10 and analog pitch command signals to the governor 42. The electric propulsion controller 12 is also configured to control the states of the battery contactors 48 on the power distribution boards 20a and 20b.

In accordance with the architecture shown in FIG. 2, the system is controlled by the electric propulsion controller 12. The electric propulsion controller 12 accepts inputs from the pilot through the thrust and pitch control levers 21 and 23. For optimal propulsion system operation, it is necessary that propeller speed be maintained constant regardless of thrust and pitch commands. The electric propulsion controller 12 receives sensor data indicating the propeller speed from the speed sensor, compares the measured speed with a reference speed signal, and generates a torque command which is sent to the engine control unit 10.

Figure 3:
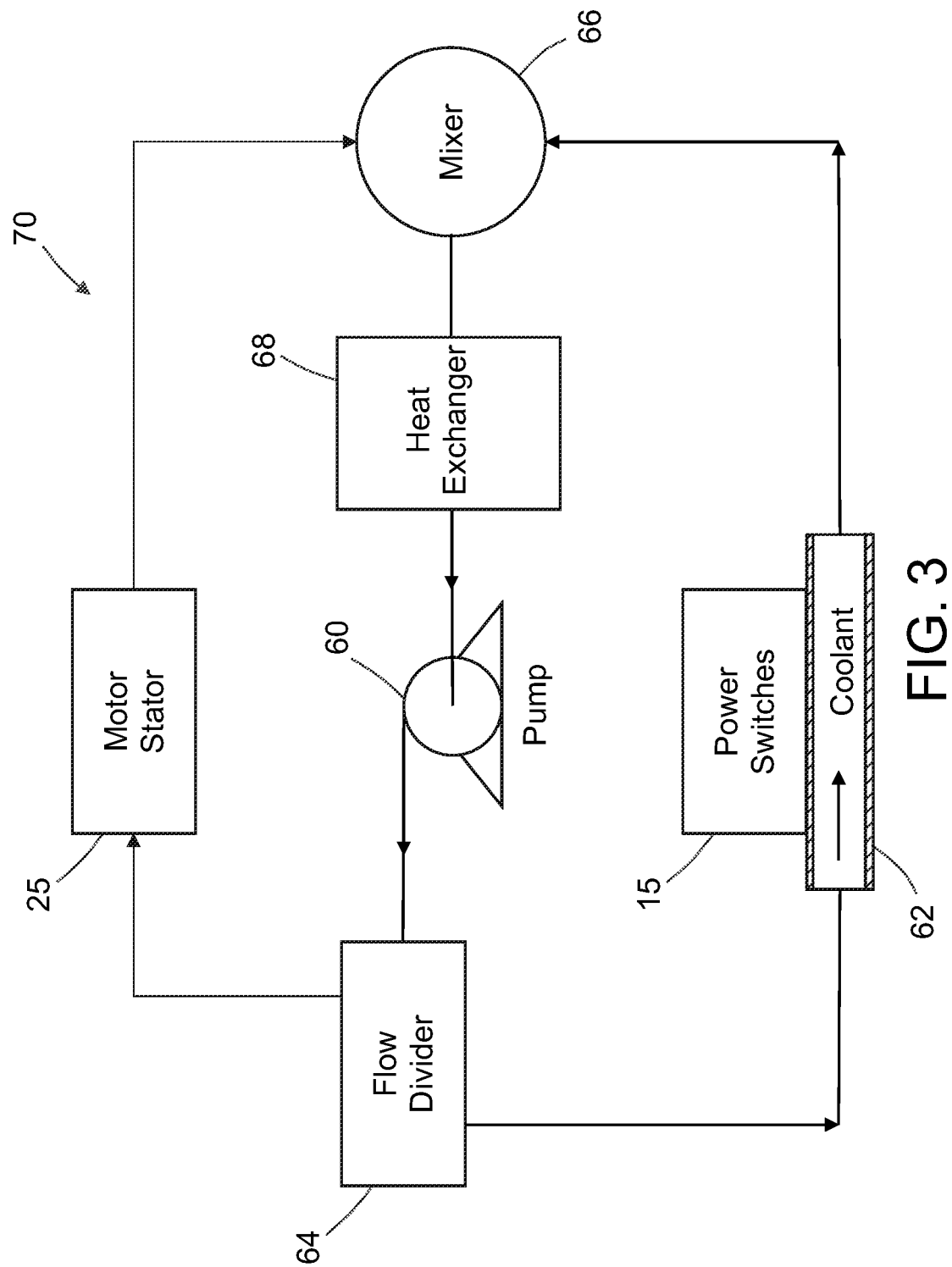
FIG. 3 is a block diagram identifying some components of a cooling system configured to remove heat from a motor and a motor controller using liquid coolant in accordance with one embodiment.

FIG. 3 is a flowchart identifying steps of an algorithm 80 (hereinafter "control algorithm 80") for controlling the rotational speed of the propeller 32 in accordance with one proposed implementation. Steps 86, 88, and 90 of the control algorithm 80 are performed by the electric propulsion controller 12; torque loop 92 of the control algorithm 80 is performed by the engine control unit 10. As seen in FIG. 3, the electric propulsion controller 12 receives a reference propeller rotational speed w_ref from a pilot interface device 82. The pilot interface device 82 includes a lookup table 84 that is configured to output a reference propeller rotational speed w_ref having a value which is dependent on the pilot input, which may be a "Speed" command or an "Action Protection" command. The "Action Protection" command is used when the pilot wants to manually shut down the propeller during any emergency situation. When this signal is used, reference speed w_ref will be set to zero. The electric propulsion controller 12 also receives the signal w from the speed and position sensor. The signal w is then compared with a reference w_ref (step 86). A speed error signal is generated and fed to speed controller transfer function Cp which transforms the speed error signal into a torque reference signal (step 88). The speed controller Cp includes a speed limiting function Wmax, so that the propeller rotational speed cannot exceed the Wmax limit to prevent an over-speed condition (step 90). The output signal from the electric propulsion controller 12 is a signal representing a torque reference T_ref which is received by the engine control unit 10. The torque loop 112 of the engine control unit 10 uses this torque reference to generate an appropriate current reference signal which is proportional to the commanded torque. The current reference signal is sent to the motor controller 50. In this way the feedback speed control loop is closed.

Referring again to FIG. 2, the motor controller 50 includes protection circuitry 44 which is configured to cause the motor controller 50 to operate in a safe mode in response to certain faults. The protection circuitry 44 is hardware based. The protection circuitry 44 is typically implemented by analog circuits. The protection circuitry 44 can issue switch control signals that respectively cause the power switches in inverter 14a or inverter 14b to close in response to a command received from the electric propulsion controller 12, which command is in turn issued in response to fault detection. More specifically, the protection circuitry 44 sends a low-power input to the gate drivers of the power switches.

FIG. 2 depicts a situation in which a fault 3 (e.g., a short circuit) has occurred on HVDC bus 4b (hereinafter "HVDC bus fault 3") and the protection system has responded. The HVDC bus fault 3 may be a differential protection fault which is detected based in part on current information provided by a current sensor 16 (see FIG. 1) that senses the current flowing through the bus contactor 48 and into the HVDC bus 4b. Differential protection is a unit-type protection for a specified zone or piece of equipment. It is based on the fact that the differential current (difference between input and output currents) will be high only when faults internal to the zone occur.

In response to detection of the HVDC bus fault 3 depicted in FIG. 2, the electric propulsion controller 12 is configured to cause the protection circuitry 44 to close all of the power switches 14b and cause the bus contactors 20 on power distribution board 20b to open. More specifically, the power switches 14b are subjected to an active short circuit (ASC) after HVDC bus fault 3 occurs. Short circuiting the power switches 14b has the effect of redirecting regenerated current from AC motor 30 to the motor controller 50 instead of the f HVDC bus fault 3. The regenerated current will circulate between the AC motor 30 and the motor controller 50. More specifically, the electric current generated in the AC motor 30 goes to the power switches 14b and circulates between the motor and power switches. Typically, the power switches 14b are solid-state devices (e.g., transistors) which have been designed to handle high current. The power switches are actively cooled by liquid coolant (oil, mix of water and propylene glycol or any other media), which is the most efficient way of removing heat generated by the fault current flowing through power devices. The AC motor 30 is also actively cooled by similar liquid coolant. Thus, all energy generated by the AC motor 30 is dissipated through losses in the motor and power switches and then removed by the active cooling system.

The ASC of channel 46b of the motor controller 50 can be commanded very quickly, within milliseconds. Because AC motor 30 and motor controller 50 are still actively cooled by liquid, the heating effect of the short circuit current circulating between AC motor 30 and channel 46b of motor controller 50 is actively managed by the cooling system. After the fault has occurred and after ASC has been commanded, the electric propulsion controller 12 commands the governor 42 to feather the propeller 32 in a well-known manner over the course of a typical interval of time. After the propeller 32 has been feathered, the air forces on the propeller 32 that cause the AC motor 30 to spin are greatly reduced. The AC motor 30 stops spinning and, therefore, stops regenerating power. When power regeneration is stopped, the power switches 14b may optionally be commanded to transition from the ASC state back to the Open state.

FIG. 4 is a block diagram identifying some components of a cooling system 70 configured to remove heat from a motor stator 25 and remove heat from power switches 14 using liquid coolant in accordance with one embodiment. The lines with an arrowhead indicate pipes which carry the liquid coolant. The liquid coolant is circulated by a pump 60. Liquid coolant exits the pump 60 and enters the flow divider 64. The flow divider 64 divides the liquid coolant into a portion that flows through the motor stator 36 and a portion that flows through a cold plate 62 that is thermally conductively coupled to the power switches 14. The flow through the motor stator 36 cools the stator windings (not shown in FIG. 3); the flow through the cold plate 62 cools the power switches 14. The hot liquid coolant is pumped into a mixer 66 and then through a heat exchanger 68. As the hot liquid coolant flows through the heat exchanger 68, it is cooled by ambient air (which acts as a heat sink). The cooled liquid coolant then flows back to the pump 60, completing one circuit.

Figure 5:
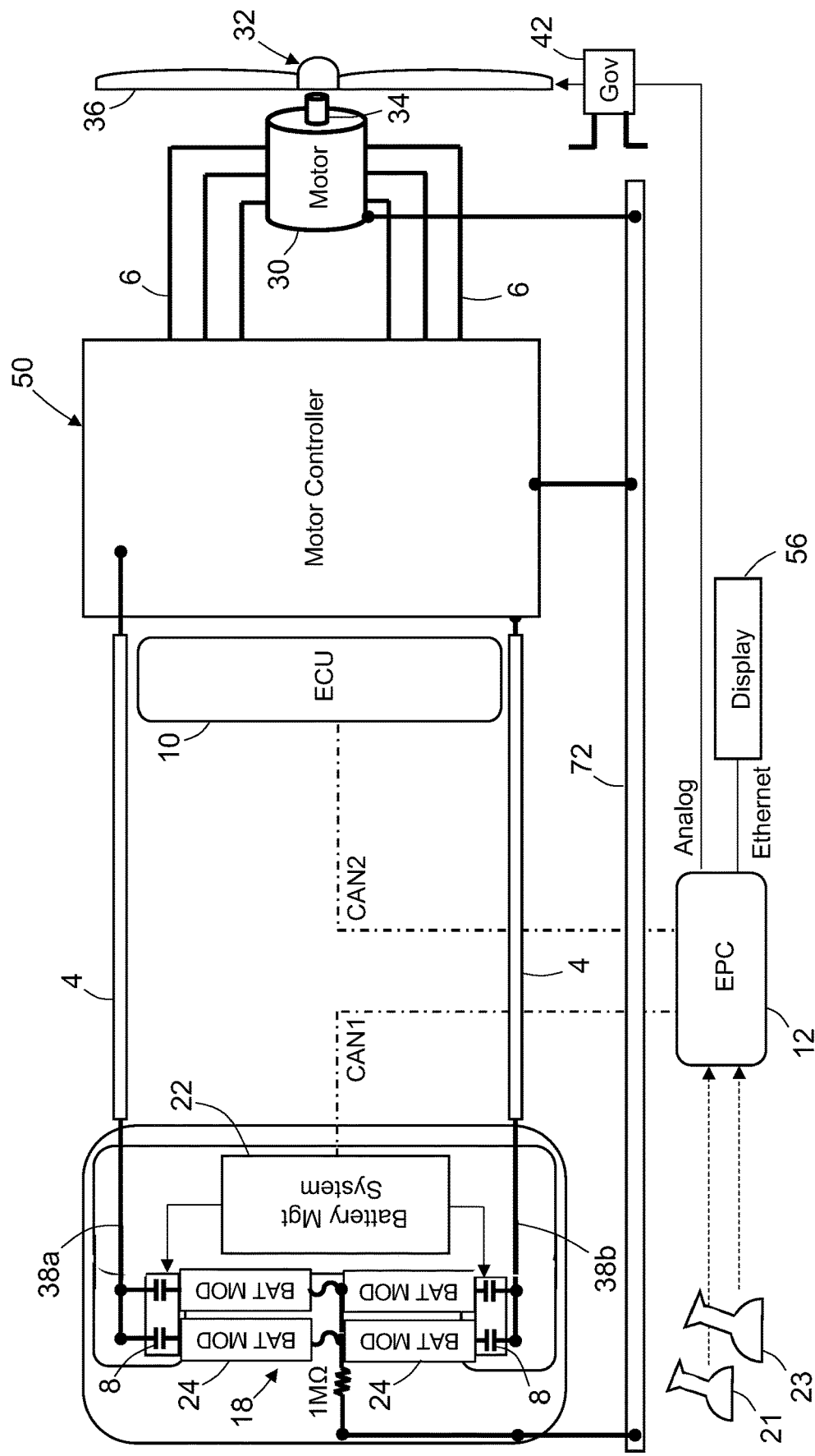
FIG. 5 is a diagram representing an aerospace electric propulsion system architecture in which the controllers communicate via control area networks in accordance with another embodiment.

FIG. 5 is a diagram representing an aerospace electric propulsion system architecture in accordance with another embodiment. The electric propulsion controller 12 receives pilot inputs from a thrust control lever 21 and pitch control lever 23. The electric propulsion controller 12 communicates with the battery management system 22 via a first controller area network (CAN1) and with the engine control unit 10 via a second controller area network (CAN2). The electric propulsion controller 12 sends analog control signals to the governor 42 for controlling feathering of the propeller 32. The electric propulsion controller 12 sends information for display to a flight display unit 56 via an Ethernet connection.

In normal operation, the battery 18 provides HVDC power to the motor controller 50. The motor controller 50 converts to DC power to AC power and drives rotation of the AC motor 30. The engine control unit 10 receives Run/Stop and Torque commands from the electric propulsion controller 12. The electric propulsion controller 12 monitors pilot inputs and the speed of the propeller. In response to a pilot input demanding thrust, the electric propulsion controller 12 calculates the Torque command for the motor controller 50. The motor controller 50 responds by applying AC currents having appropriate magnitudes and phases to the motor 30, which generates torque for rotating the propeller 32. The governor 42 adjusts the rotational speed of the propeller speed 32 by changing the pitch of the propeller blades 36. In the event that the pilot demands more thrust, the electric propulsion controller 12 commands more torque to the motor controller 50. The propeller 32 tends to increase its speed, but the governor 42 reacts on speed increase and in turn increases blade pitch, which results in thrust increase as commanded by the pilot. Thus, speed of the propeller is maintained constant through all operation and propeller thrust is changed by changing the motor torque and propeller pitch settings.

FIG. 5 also shows a scheme for grounding the electric propulsion unit equipment on the airplane in accordance with one embodiment. A current return network includes an aluminum structure that serves as a current return network 72. In terrestrial power systems, the equipment is grounded to the buildings and facilities, and those buildings are eventually grounded to earth, typically through copper rods, piping, etc. On an airplane, there is no earth, so it is replaced by a conductive and lightweight structure (typically aluminum). This is where all electrical equipment is grounded. The current return network 72 is connected to the mid-point of battery system through a large 1-MOhm resistor in accordance with a grounding concept that is called "high-impedance grounding". The enclosure of the motor controller 50 and the motor housing are also grounded to the current return network 72. Grounding schemes often affect how protections inside of various pieces of equipment are working and what type of protection is chosen.

A high-power electric propulsion unit may include multiple motors and motor controllers coupled together. In addition, each motor controller 50 may include multiple inverters, each inverter comprising a plurality of power switches. The power switches of each inverter are switched to supply 3-phase AC power to the motor.

Figure 6:
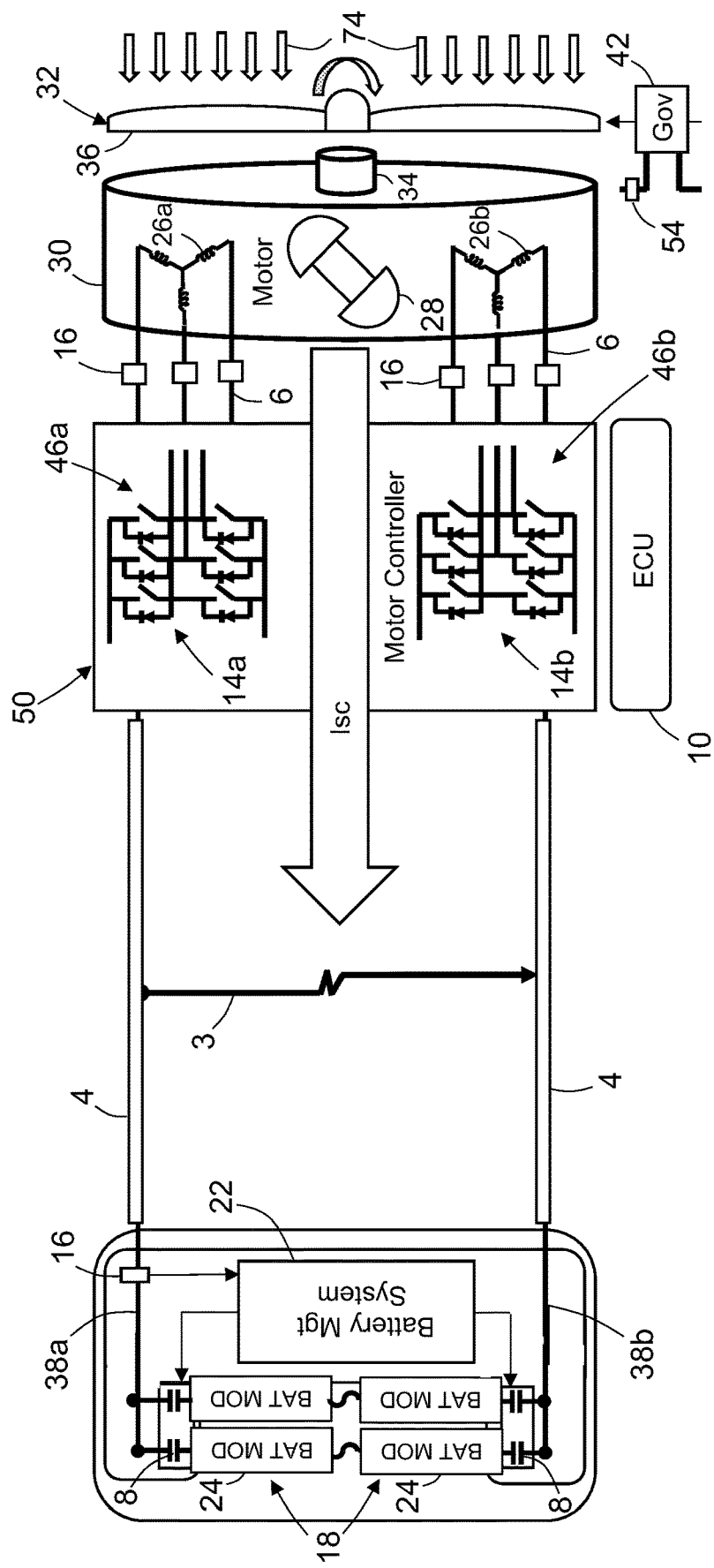
FIG. 6 is a diagram representing an electric propulsion control architecture in which a HVDC bus fault has occurred, which fault is being fed by short-circuit current regenerated by the motor.

For example, FIG. 6 depicts an AC motor 30 that includes star-connected stator windings 26a which receive 3-phase AC power from inverter 14a and star-connected stator windings 26b which receive 3-phase AC power from inverter 14b via AC power lines 6. Each set of 3-phase windings is driven by its own inverter or motor controller. This is done to mitigate passing of high currents needed to create high torque for propulsion through the motor windings. Motors with multiple windings can also provide additional benefits on a system level, such as fault tolerance. In case of failure in one winding of the motor, the propulsion system could still operate using other windings with reduced capacity. Motors and motor controllers with multiple (three, four, six, etc.) star-connected 3-phase stator windings can be developed, thus increasing fault tolerance and reducing overall impact on a propulsion system, if there is a failure of a single channel.

FIG. 6 depicts a HVDC bus fault 3 which, for example, may occur between positive and negative voltage rails of a HVDC bus 4. The battery protection (fuse and/or string contactors 8) reacts very quickly and the battery 18 is disconnected from the HVDC bus fault 3. Before the battery protection function has reacted, the HVDC bus fault 3 is sourced from battery 18. However, even after battery 18 has been disconnected from the HVDC bus 4, large air forces (indicated by acting on the propeller 32 continue to spin the motor 30, causing motor 30 to generate AC power which feeds the fault even though all power switches of inverters 14a and 14b are open. The result is a short-circuit current $I_{sc}$ which feeds the HVDC bus fault 3.

When the HVDC bus fault 3 is detected, the electric propulsion controller 10 commands the governor 42 to feather the propeller 32 by changing the pitch of the propeller blades 36 to reduce the air forces on propeller 32 and stop the motor spin. The propeller feathering process can take up to 10 seconds, during which the motor 30 acts approximately as a constant current source and continues to feed the fault, if no action is taken. For fault-redundant architectures such as shown in FIG. 2, the propeller 32 may not be feathered and operation with failure in one channel may continue indefinitely.

Figure 7:
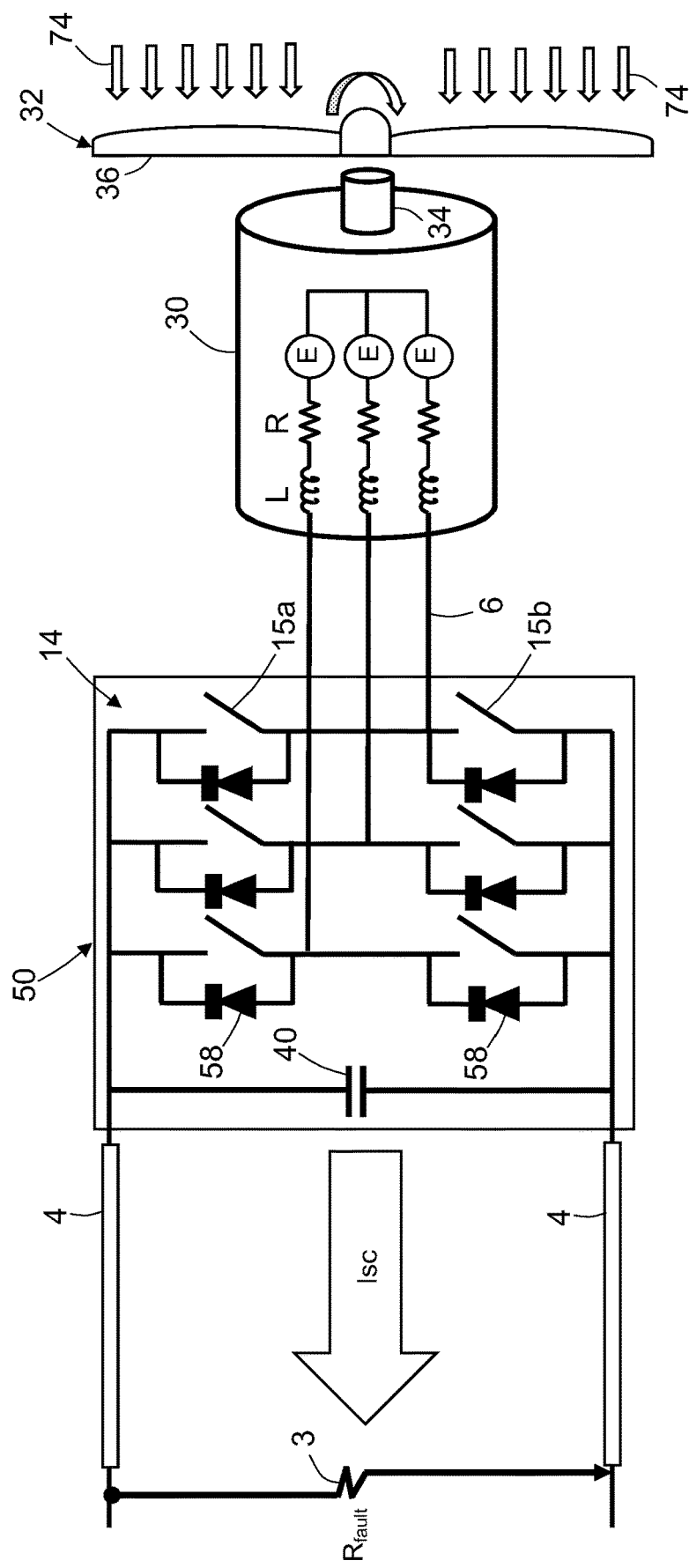
FIG. 7 is a diagram showing one inverter of a motor controller in which the power switches remain open while an HVDC bus fault is being fed by short-circuit current regenerated by the motor.

FIG. 7 is a diagram showing circuitry of one inverter 14 in a motor controller 50 while an HVDC bus fault 3 is being fed by short-circuit current regenerated by the motor 30. Each inverter in the motor controller 50 includes an upper row of three power switches 15a and a lower row of three power switches 15b. The motor controller 50 also includes a DC link capacitor 40 and other front-end circuitry not shown in the drawings. The first power switch in the upper row and the first power switch in the lower row are connected to a first stator winding in motor 30; the second power switch in the upper row and the second power switch in the lower row are connected to a second stator winding in motor 30; and the third power switch in the upper row and the third power switch in the lower row are connected to a third stator winding in motor 30. The first, second, and third stator windings are at respective angular positions separated by 120 degrees. DC link capacitors are used in order to provide a more stable DC voltage, limiting its fluctuations even under heavy current absorption by the inverter: In practice, a DC-link capacitor acts as a filter to compensate for switching losses caused by the transition of MOSFET switches from the On state to the Off state and vice versa.

FIG. 7 also shows equivalent circuitry of the motor 30 for the system depicted in FIG. 6. Each equivalent circuit of the motor 30 includes an electromotive force E, a resistance R, and an inductance L. The electromotive force source is like a voltage source, the electromotive force E being generated when motor 30 is spun by external air forces (indicated by arrows 74 in FIG. 7), such as wind turning the propeller 32. The electromotive force E may be calculated using the equation:

$$E = K_t \times \text{Speed},$$

where $K_t$ is the motor torque constant, and "Speed" is mechanical speed of the motor. The short-circuit current $I_{sc}$ may be calculated using the equation:

$$I_{sc} = E/(L^2 w^2 + R^2)^{1/2} \approx K_t/L.$$

where the angular velocity w is the electrical frequency of the motor current. Thus, the short-circuit current $I_{sc}$ is proportional to the back electromotive force E and inversely proportional to the motor inductance L.

Upon the occurrence of a HVDC bus fault 3, the motor 30 acts as a constant current source all of the time until the propeller 32 is fully feathered and the motor 30 stops rotation. During a time interval of approximately ten seconds, while the governor 42 is feathering the propeller 32, the pitch of propeller blades 36 changes and the speed of the motor 30 is gradually reduced. The reduced speed results in a lower electromotive force E being generated by the motor 30. However, at the same time the impedance of the motor 30 is also being reduced proportionally to the speed. Therefore, even though with reduced speed a lower EMF is generated, the fault current is still the same because the motor 30 is becoming a decreasing impedance source for the fault. Thus, the fault current is independent of motor speed, until the speed is close to zero. Without any action, thousands of amperes can feed the fault for several seconds, which high current is undesirable.

The magnitude of the short-circuit current $I_{sc}$ is dependent on motor design. For example, it is possible to design a motor in which the short-circuit current is the same as the nominal operating current. However, a motor designed in this way should have a larger inductance L and a larger air gap between the stator and rotor to reduce the motor torque constant $K_t$. A larger air gap creates more magnetic flux leakage and, therefore, to achieve the same nominal power, the motor 30 will have more magnets and more turns in the windings. This leads to heavier, bigger, and less optimal motor designs.

Therefore, for more optimal and more power-dense aerospace motors, this disclosure proposes designs with smaller air gap, larger motor torque constant $K_t$, and smaller inductance L to achieve the same nominal power. However, the short-circuit current for such motor designs will be higher. If the nominal operating current of the motor 30 at full torque and maximum speed is 1.0 per unit (p.u.), the optimal motor designs for power density can be selected such that the short-circuit current of motor 30 is within a range of 1.2 to 1.5 p.u. (In per unit notation, the physical quantity is expressed as a fraction of a base value which is a reference value for magnitude.)

Figure 8:
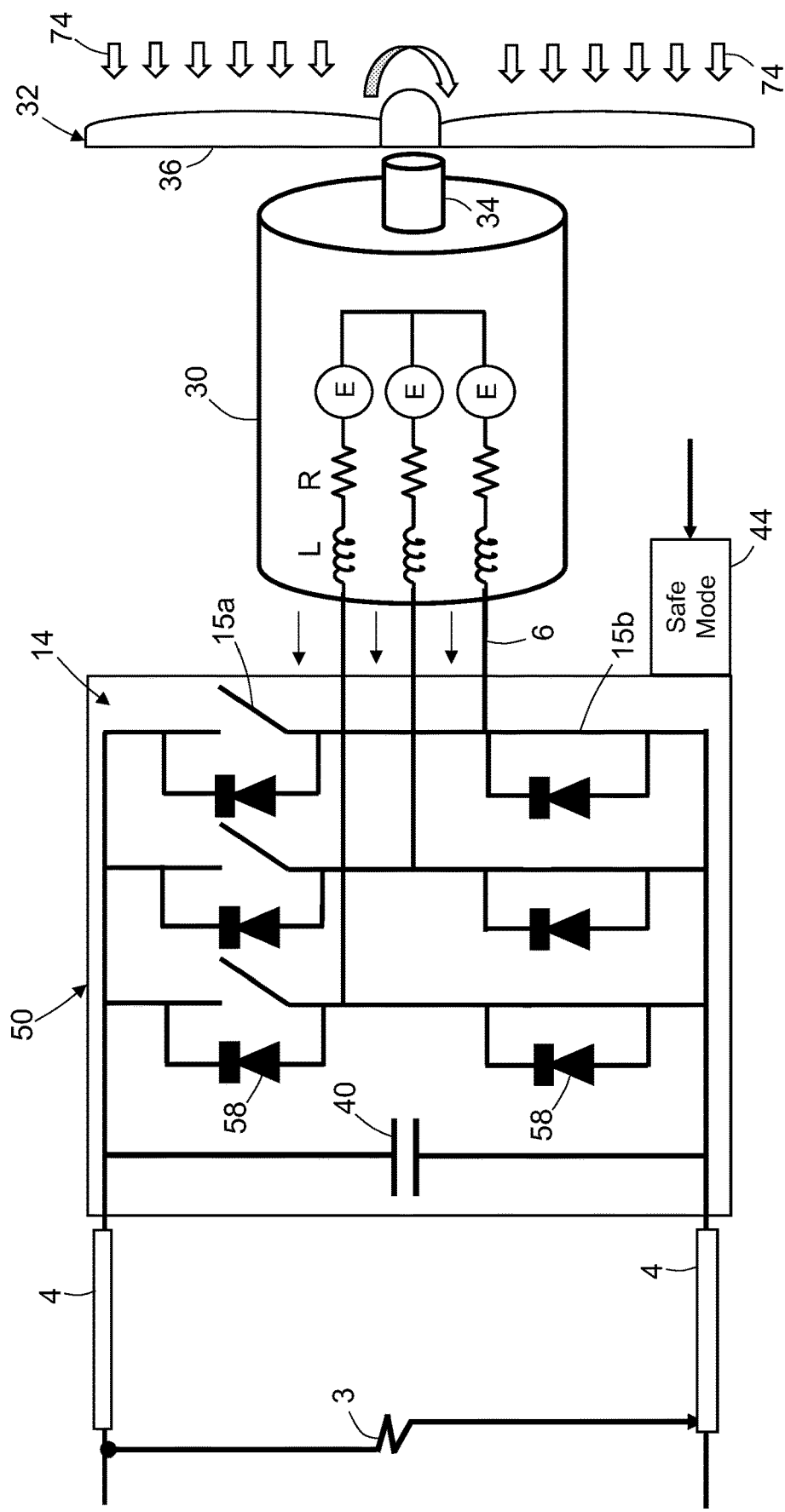
FIG. 8 is a diagram showing one inverter of a motor controller in which a lower row of three power switches have been closed in response to an HVDC bus fault while an upper row of three power switches remain open.

To reduce the amount of motor-regenerated current feeding the fault during propeller feathering, the innovative technology proposed herein diverts current from the fault by shorting power switches in the motor controller 50. One such active short circuit (ASC) of the motor controller 50 is shown in FIG. 8, where the lower row of three power switches 15b of each inverter in the motor controller 50 are closed while the upper row of three power switches 15a remain open. It is also possible to close the upper row of three power switches 15a of each inverter while the lower row of power switches 15b remain open. Since the battery 18 (shown in FIG. 6) can still be connected to the motor controller 50, closing all six power switches of any inverter is not possible because in this case, the battery source can be short circuited through the motor controller 50, sending thousands of amperes through power switches not designed to withstand such high current.

Figure 9:
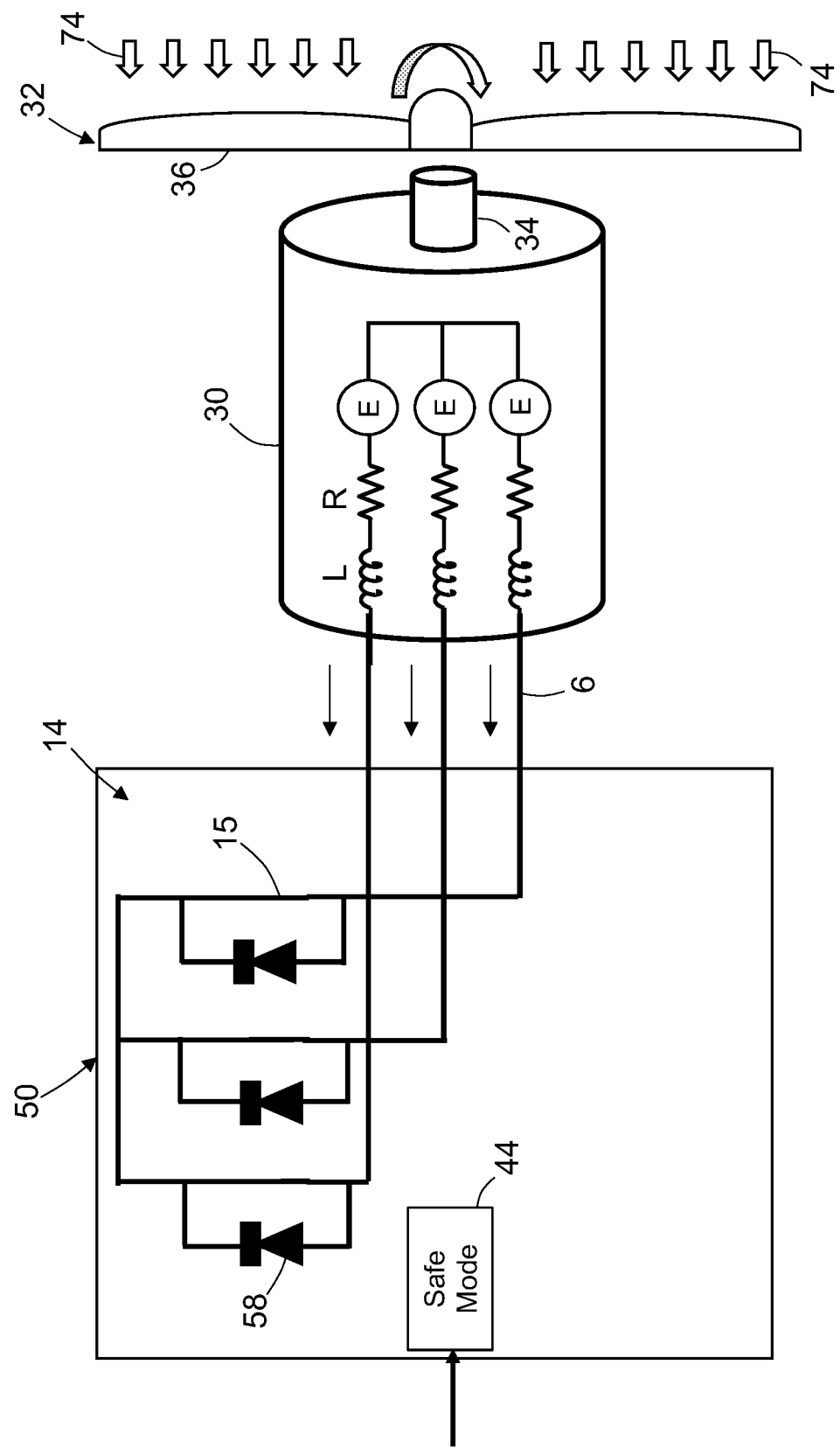
FIG. 9 is a diagram showing a row of three power switches in a motor controller which have been closed in response to an HVDC bus fault.

In accordance with one proposed implementation of a method for protecting the motor controller 50, the active short circuit may be invoked by closing either the upper or lower row of power switches of each inverter. FIG. 9 is a diagram showing one row of three inverter power switches 15 of an inverter 14 which have been closed upon transition to a safe mode of operation in response to detection of a HVDC bus fault 3. In this fault condition, when the motor 30 is short circuited, the motor short-circuit current $I_{sc}$ for an optimal power dense design is 1.2 to 1.5 p.u. For example, the motor short-circuit current $I_{sc}$ is 1.2 to 1.5 times the maximum nominal operating current $I_{nom}$ (1.0 p.u.) of the motor 30. When this current is conducted through the set of three power switches 15, the short-circuit current $I_{sc}$ will be in a range $\sqrt{2} \times 1.2$ to $\sqrt{2} \times 1.5$ of maximum nominal operating current. The power $P_{dis}$ dissipated in each switch is proportional to the square of the current ($P_{dis}=R_{on}I_{sc}^2$, where $R_{on}$ is the ON resistance of the switch), i.e., from $(\sqrt{2} \times 1.2)^2 = 2.9$ to $(\sqrt{2} \times 1.5)^2 = 4.5$. Therefore, during ASC through three power switches 15 of the motor controller 50, the power dissipation through each of the switches is increased by almost 3 to 5 times. Since the switch junction temperature $T_j$ is proportional to dissipated power, the junction temperature of the power switches 15 will begin to rise. As the temperature exceeds the switch rating (typically 175° C.), the switches may be damaged. Therefore, if the ACS condition lasts too long (seconds), the closed power switches 15 may be damaged. It is not possible to stay in this condition while waiting for complete propeller feathering (10 seconds). Another solution is to oversize the power switches to withstand large short-circuit current. However, this will result in a significant increase in weight and size of the motor controller 50, which is not acceptable for aerospace electric propulsion application.

Figure 9A:
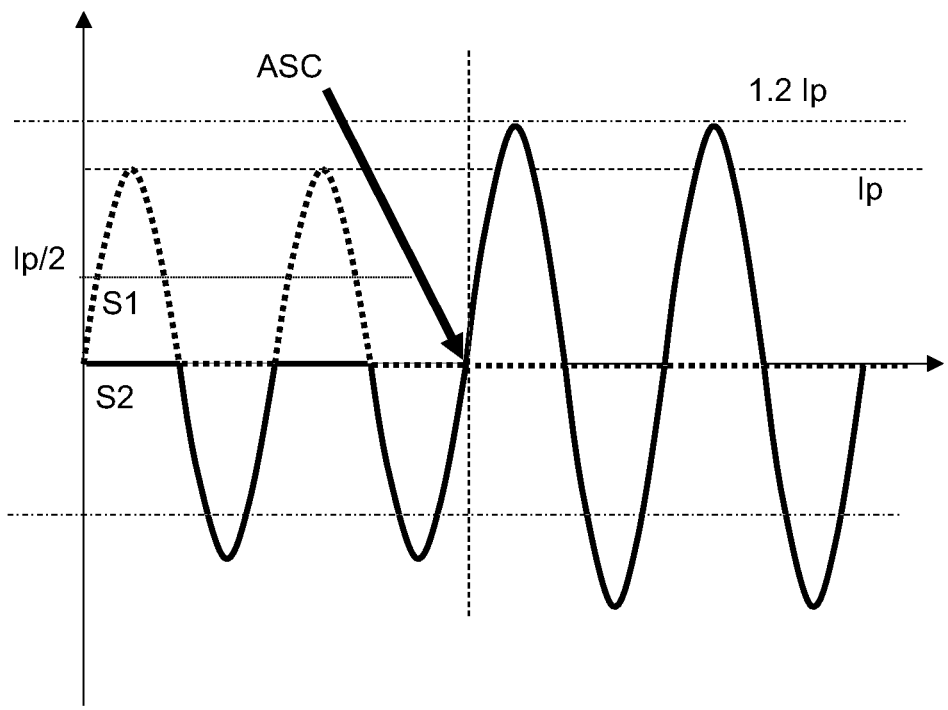
FIG. 9A is a graph showing the current versus time for respective currents flowing through one lower switch and its complementary upper switch of an inverter in the motor controller before and after initiation of an active short circuit.

FIG. 9A is a graph showing the current versus time for the respective currents flowing through one of the lower switches S1 and its complementary upper switch S2 in one inverter. On the graph, the active short circuit (ASC) is initiated in the upper switches (including switch S2) at an instant in time that is indicated by an arrow. The current through switch S1 is indicated by the dotted waveform; the current through switch S2 is indicated by the solid waveform. During normal operation (prior to the ASC), the switches S1 and S2 conduct only a respective half of the sinusoidal cycle. After ASC, the lower switch S1 is open and does not conduct anymore. However, the upper switch S2 is shorted and now conducts a full cycle instead of a half-cycle. Furthermore, the peak current $I_P$ due to the short-circuit current regenerated by the motor 30 is higher (1.2 p.u.).

As previously mentioned, most of the power switches are rated at 175° C. for maximum junction temperature. Therefore, one of the constraints on the inverter design is that the junction temperature during a short circuit cannot exceed 175° C. Similar design constraints apply to the motor. The power loss in the copper windings of the motor 30 is proportional to the square of the short-circuit current $I_{sc}$ in the motor, which is 1.2 times the nominal operating current during the short circuit. Thus, the temperature of the copper windings in the motor 30 cannot exceed 230° C.

Figure 9B:
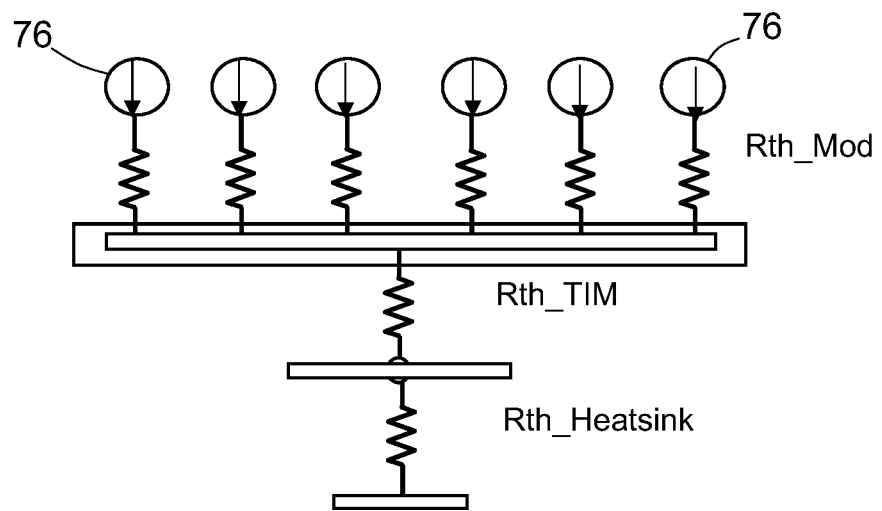
FIG. 9B is a tree diagram showing a stack-up of thermal resistances when a power module is connected to a heat sink.

FIG. 9B is a tree diagram showing a stack-up of thermal resistances when a power module is connected to a heat sink. The heat sources 76 at the junction of the power device (or power switch) are indicated by encircled arrows. The junction of the power device is inside of the power module. There is thermal resistance Rth_Mod inside of the module Rth_Mod. The power module is connected to a heat sink through a thermal interface material (TIM) (such as thermal grease). Rth_TIM represents the thermal resistance of the thermal interface material and Rth_Heatsink represents the thermal resistance of the heat sink. It is important to consider all of the thermal resistances in order to guarantee that the junction temperature of the power device will not exceed its rated maximum allowable junction temperature (typically 175° C.).

Figure 10:
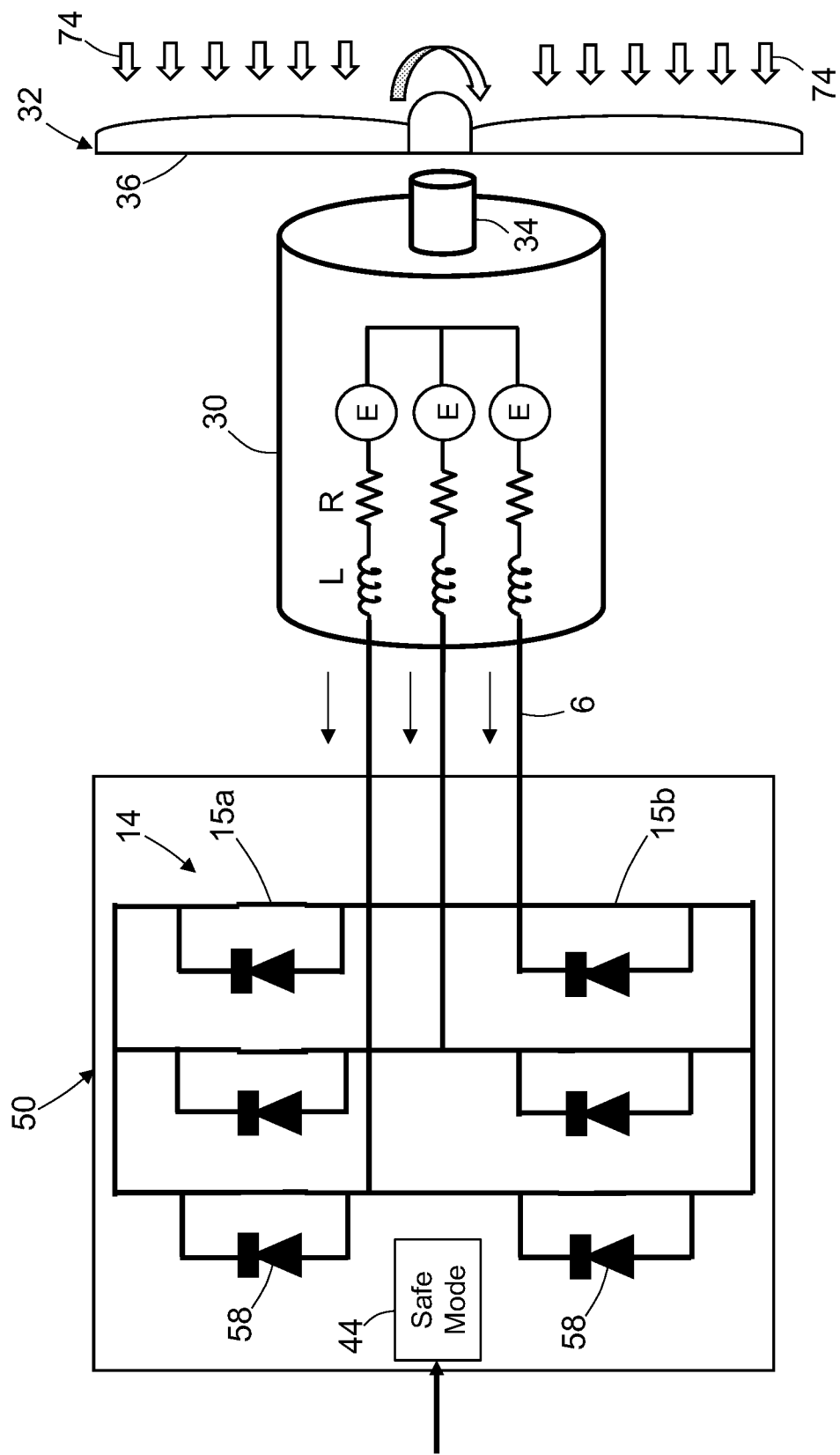
FIG. 10 is a diagram showing one inverter of a motor controller in which all six power switches have been closed in response to an HVDC bus fault.

In accordance with another proposed implementation of a method for protecting the motor controller 50, the active short circuit may be invoked by closing all six power switches of the inverter 14. FIG. 10 is a diagram showing the upper row of three power switches 15a and the lower row of three power switches 15b of an inverter 14. All six switches have been closed upon transition to a six-switches-closed (SSC) mode of operation in response to detection of a HVDC bus fault 3. In this fault condition, when the motor 30 is short circuited, the motor short-circuit current $I_{sc}$ for an optimal power dense design is again 1.2 to 1.5 p.u. For example, the motor short-circuit current $I_{sc}$ is 1.2 to 1.5 times the maximum nominal operating current $I_{nom}$ (1.0 p.u.) of the motor 30. However, when this current is distributed through all six switches, the current through each switch is reduced by 2, i.e., the short-circuit current $I_{sc}$ through each switch will be in a range of $\sqrt{2} \times 0.6$ to $\sqrt{2} \times 0.75$ of maximum nominal operating current. The power $P_{dis}$ dissipated in each switch is proportional to the square of the current, i.e., from $(\sqrt{2} \times 0.6)^2 = 0.72$ to $(\sqrt{2} \times 0.75)^2 = 1.1$, which is lower than or very close to the nominal operating current through the switch. In this condition, the power switches 15a and 15b can operate indefinitely.

Figure 10A:
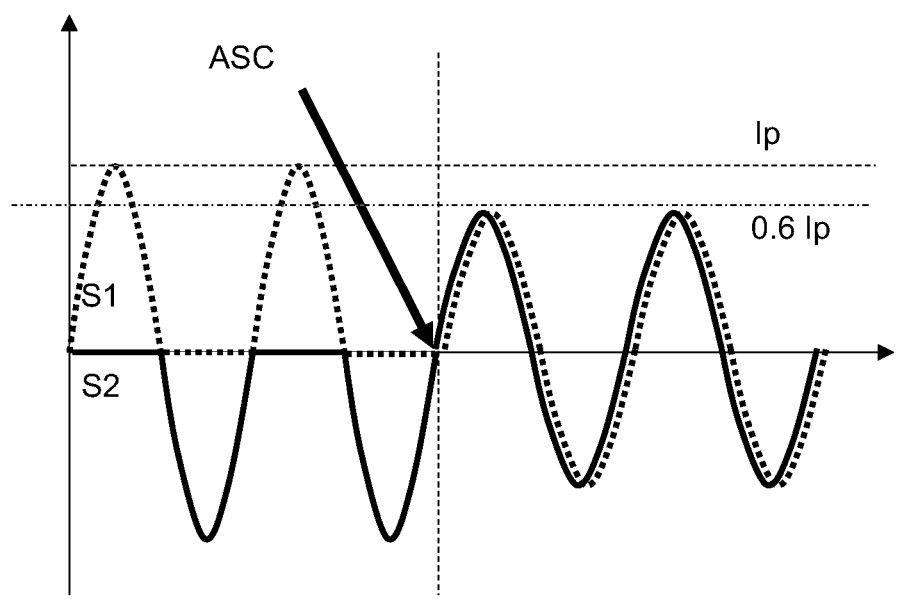
FIG. 10A is a graph showing the current versus time for respective currents flowing through one lower switch and its complementary upper switch of an inverter in the motor controller.

FIG. 10A is a graph showing the current versus time for the respective currents flowing through one of the lower switches S1 and its complementary upper switch S2 in an inverter in which all six switches have been closed. On the graph, the active short circuit (ASC) is initiated in the upper switches (including switch S2) at an instant in time that is indicated by an arrow. The current through switch S1 is indicated by the dotted waveform; the current through switch S2 is indicated by the solid waveform. During normal operation (prior to the ASC), the switches S1 and S2 conduct only a respective half of the sinusoidal cycle. After ASC, the lower switch S1 and upper switch S2 are shorted and now conduct a full cycle instead of a half-cycle. Furthermore, the peak current $I_P$ due to the short-circuit current regenerated by the motor 30 is lower (0.6 p.u.). Therefore, the junction temperature of the switch will not exceed the maximum allowable junction temperature because the system is designed to handle the full amount of losses during normal operation.

Figure 11:
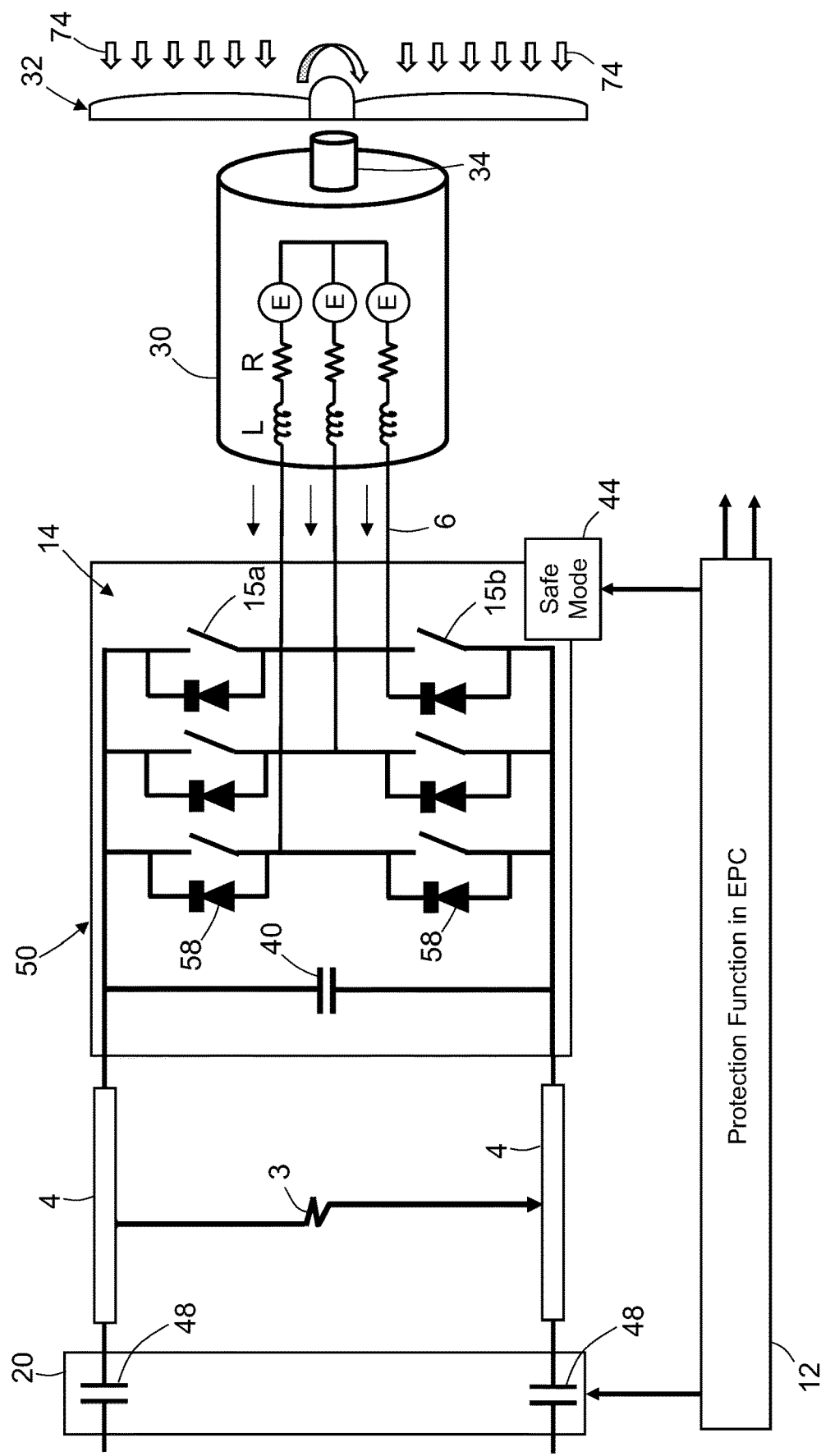
FIG. 11 is a diagram showing components of an electric propulsion unit in accordance with one embodiment, including a motor controller inverter and an electric propulsion controller configured to perform a protection function in response to detection of an HVDC bus fault.
Figure 12:
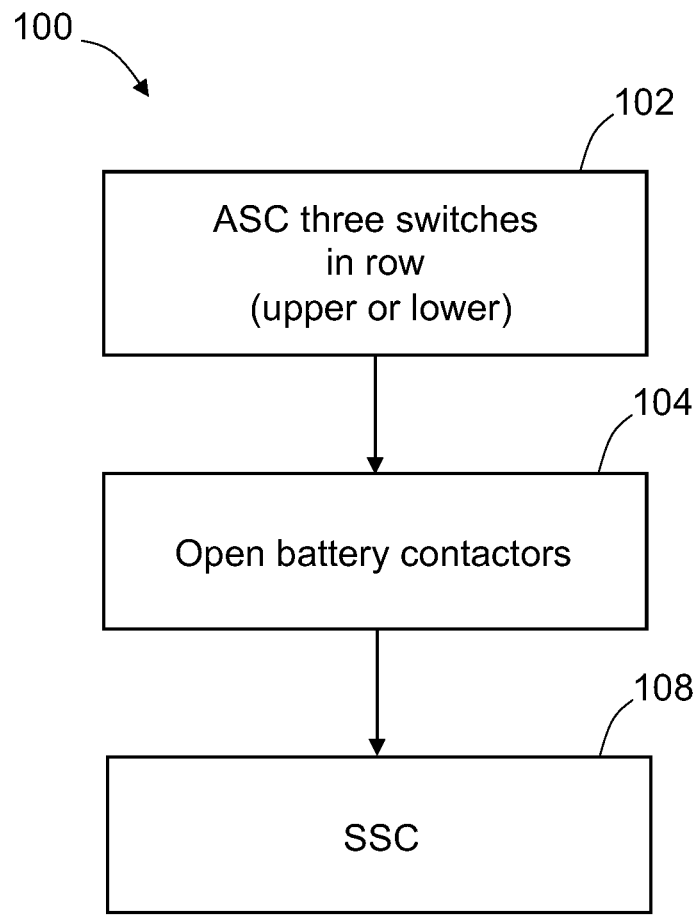
FIG. 12 is a flowchart identifying steps of a method performed by a protection function in accordance with one embodiment.

In accordance with one embodiment, the electric propulsion controller 12 is configured to perform a protection function in response to detection of an HVDC bus fault 3, as depicted in FIG. 11. The method 100 performed by that protection function includes the sequence of operations shown in FIG. 12. When the fault on the HVDC bus 4 is detected, the ASC (i.e., closure) of the three (upper or lower) power switches of the motor controller 50 is commanded by the electric propulsion controller 12 (step 102). At the same time or nearly the same time, the electric propulsion controller 12 commands the battery contactors 48 to open and the DC link capacitor 40 is bled (step 104). When the bus contactors 48 are confirmed as Open (typically, within less than 50 msec), the electric propulsion controller 12 commands the motor controller 50 to go from three switches closed to six switches closed (step 108). In other words, all power switches which remain open are now closed. However, it is not possible to short all six switches if the battery 18 is still connected to the motor controller 50. In the HVDC bus fault condition, there will be a large current flowing from the battery 18. Therefore, the battery 18 has to be disconnected before activating the SSC mode.

During bus contactor opening, it is also possible to periodically change the three switches closed condition from the lower power switches 15b to the upper power switches 15a (and vice versa) to reduce thermal stress on the switches. For example, if the bus contactor opening time is 50 msec, it is possible to keep the upper three switches 15a of the motor controller 50 closed for 10 msec, then open the upper and close the lower switches for 10 msec etc. until the bus contactors are confirmed in the Open position. Once the bus contactors 48 are confirmed as Open, the motor controller 50 is commanded into the SSC mode.

In addition, in response to detection of the HVDC bus fault 3, the electric propulsion controller 12 commands the governor 42 (see FIG. 6) to start feathering the propeller 32. The electric propulsion controller 12 also monitors the propeller speed w. When the propeller 32 is fully feathered, the speed of the motor drops close to zero and no regeneration energy is coming from the motor 30. Keeping the motor controller 50 in the SSC mode also applies braking torque to the motor 30, which also helps to maintain the motor and propeller speed of rotation at zero. As a result, the motor 30 and inverter 14 are in a safe operating mode.

For an airplane that has dual motor-driven propellers (engines), it is critical to feather the propeller 32 of the failed propulsion channel. The airplane can still fly with one engine. However, if the propeller 32 of the failed propulsion channel is not feathered, this condition creates large asymmetric thrust that may make the airplane uncontrollable after some time.

Other possible failures that can create high-current/high-energy conditions are as follows: a power switch fails short, a phase-to-phase or three-phase short in the feeders between the motor controller 50 and the motor 30, and a motor turn-to-turn short circuit in a winding.

Figure 13:
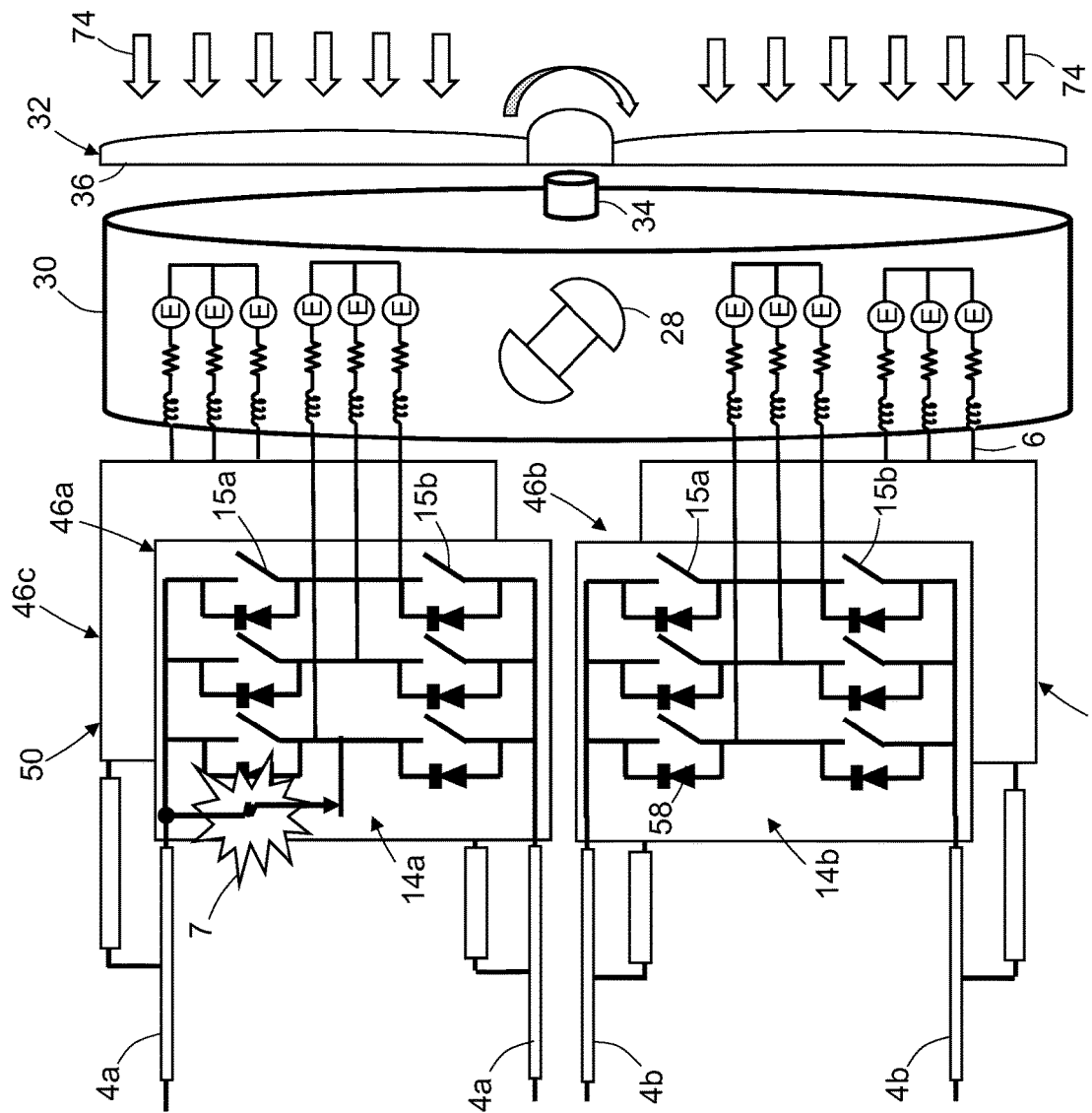
FIG. 13 is a diagram showing some components of an electric propulsion unit in which one channel of a four-channel motor controller has a short-circuited power switch.

FIG. 13 is a diagram showing some components of an electric propulsion unit in which the motor controller 50 has four channels 46a-46d. Each channel includes an inverter. Only inverters 14a and 14b in channels 46a and 46b respectively are visible in FIG. 13. In the scenario depicted in FIG. 13, the inverter 14a has a short-circuited power switch (leftmost) in the upper row of power switches 15a.

Normally, as developed over the years in the power electronics industry, when there is shoot-through, desaturation protection on the power device level is actuated. Shoot-through can happen when a short circuit is detected between positive and negative rails with a large short-circuit current flowing through upper and lower power devices. In normal operation, the upper and lower switches of the same phase leg are never On at the same time. Upper and lower switches should always operate out of phase, i.e., when the upper switch is closed, the lower switch is open and vice versa. During the shoot-through condition, both the upper and lower power switches are closed due to any abnormal reason. Possible reasons for the shoot-through condition could be software errors commanding both switches into the On position, processor latch-ups, electromagnetic interference creating a false turn-on command to the gate driver, etc. Since shoot-through is an undesirable condition, it must be detected and cleared very fast, which can be achieved using desaturation protection.

Desaturation protection is an analog circuit that continuously monitors voltage across the power device along with device commanded state. When the power device is in the On state, the voltage across the device should be low; when the power device is in the Off state, voltage across the device should be high. Since one of the power devices in the phase leg, upper or lower, must be Off, the shoot-through condition is detected when the voltage across both power devices is low at the same time (concurrently). In this case, both power switches are quickly commanded to the Off state within a few microseconds and all of the other switches in the six-switch inverter 14 are also commanded to the Off state. When one power switch in the motor controller fails short, desaturation protection will trigger, because the power switch cannot open when commanded to the Off state. The desaturation protection will open all six power switches in the inverter 14.

The foregoing protection procedure was simulated by computer. When the fault was simulated, a large electromagnetic torque ripple was produced. After desaturation protection commands the six switches to open (SSO) for the first inverter of the motor controller 50 first and then the other inverters (second through fourth inverters in the example depicted in FIG. 13), at this time all power switches 15a and 15b are open and the motor 30 is spinning down. However, it takes several seconds for the motor 30 to spin down, during which time the motor 30 regenerates energy, which is circulating through the failed power switch and the conducting freewheeling diodes 58. The simulation indicated that this condition creates a very high-frequency torque ripple (plus/minus 1000 Nm in magnitude). This high-frequency torque ripple is present in all mechanical interfaces of the motor 30 and the propeller shaft 34. If that ripple persists for several seconds, the ripple may adversely affect the structural integrity of the motor 30 and propeller shaft 34. To minimize the duration of this undesirable condition, this disclosure proposes innovative protection logic.

Figure 14:
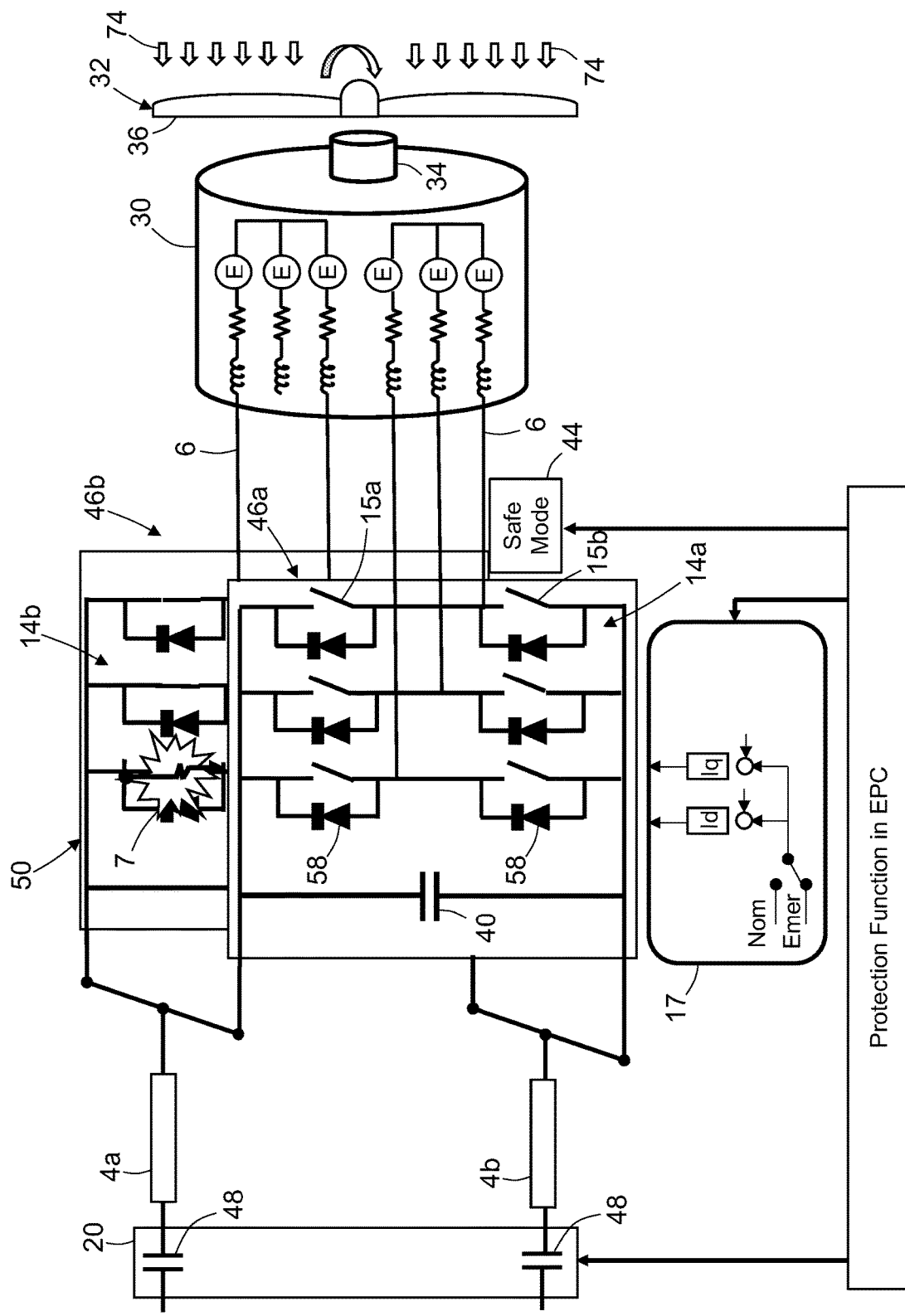
FIG. 14 is a diagram showing components of a protection system configured to take protective action to ameliorate the consequences of a short-circuited power switch in an inverter of a motor controller.

FIG. 14 is a diagram showing components of a protection subsystem in accordance with one embodiment, which subsystem includes controllers configured to take protective action to ameliorate the consequences of a short-circuited power switch in any one of the inverters of the motor controller 50. More specifically, FIG. 14 shows a scenario in which a power switch short-circuit fault 7 has occurred in the leftmost power switch in one channel 46b of a motor controller 50. The motor controller 50 includes a plurality of inverters (FIG. 14 shows two inverters 14a and 14b), each inverter being controlled by a respective inverter controller that receives signals representing reference quadrature and direct currents from an engine control unit 10 that is configured to perform a vector control function. Vector control, also called field-oriented control, is a variable-frequency drive control method in which the stator currents (quadrature current $I_q$ and direct current $I_d$) of a three-phase AC electric motor are identified as two orthogonal phasor components that can be visualized with a vector. One component defines the magnetic flux of the motor, the other the torque.

An $I_d/I_q$ controller 17 (part of the engine control unit 10) calculates the corresponding current component references $I_q$ and $I_d$ from the flux and torque references given by the electric propulsion controller 12. The $I_d$ and $I_q$ arrows in FIG. 14 signify that by changing the $I_d$ and $I_q$ values, some specific motor and motor controller characteristics change. The $I_d$ and $I_q$ values affect control characteristics and therefore affect hardware response through change. More specifically, the inverter controller (not shown in FIG. 14) then calculates quadrature and direct voltages based on quadrature and direct current error signals. Field-oriented control is a powerful control strategy to control torque of 3-phase AC motors with high accuracy and bandwidth. It can be implemented in either hardware or software. This motor control function requires information about rotor position. This information can be obtained by using position sensors (like resolvers, for example). However, sensorless motor control can also be employed as a variation. Sensorless control is when instead of relying on sensors for rotor position sensing, the mathematical model or "observer" inside of the motor controller is used to derive rotor position from motor currents and voltages.

The $I_d/I_q$ controller 17 depicted in FIG. 14 operates in two modes: Nominal ("Nom" in FIG. 14) mode and Emergency ("Emer" in FIG. 14) mode. Controller operation during the Nominal mode is not within the scope of this disclosure. In the Emergency mode, the $I_d/I_q$ controller 17 generates reference currents $I_q$ and $I_d$ which are calculated to discharge the DC link capacitor 40. In particular, the $I_d/I_q$ controller 17 commands a large direct current $I_d$. This will not create torque in the motor 30, but it will quickly discharge the DC link capacitor 40, so that it is safe to go into the SSC mode (six switches closed).

Figure 15:
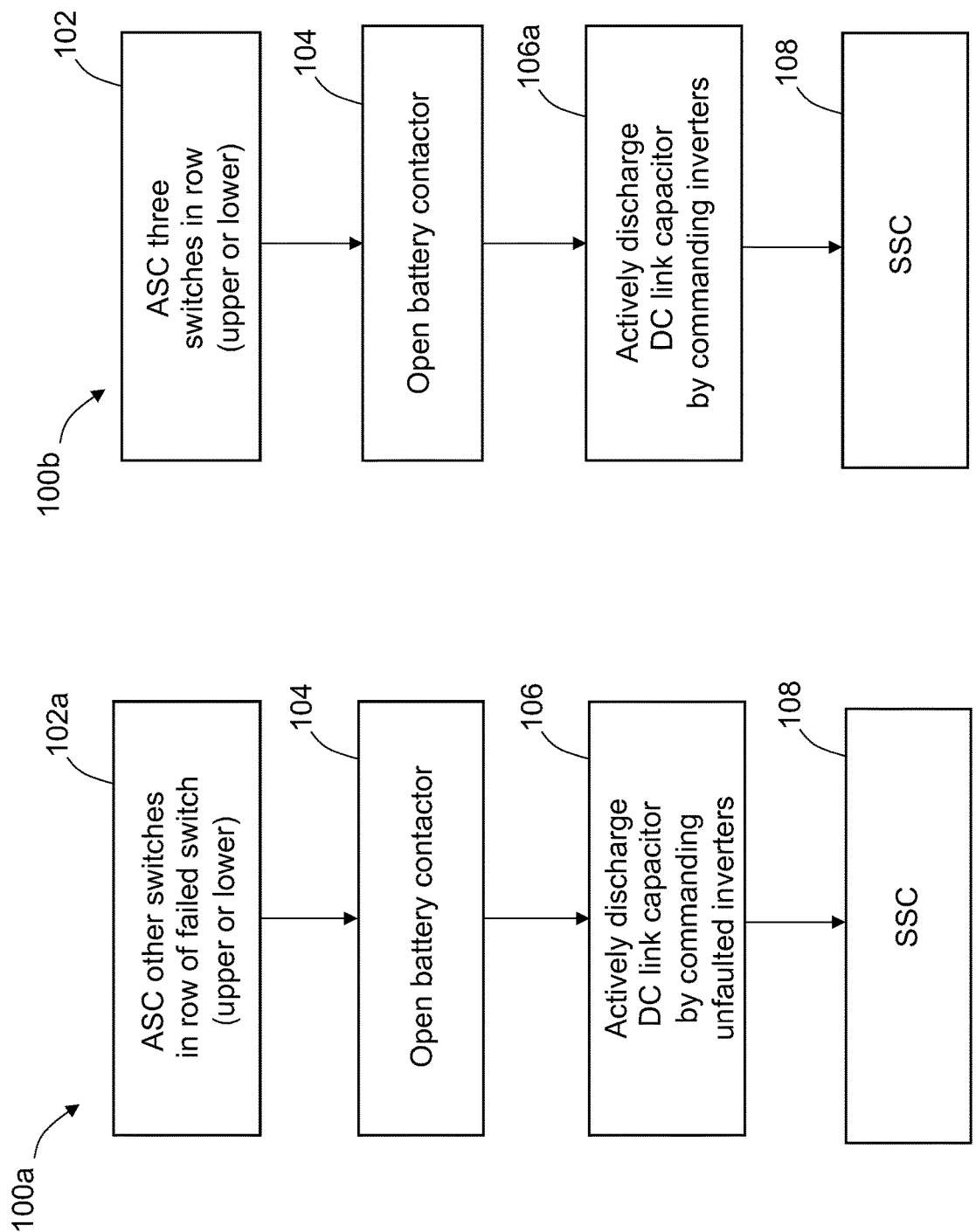
FIG. 15 is a flowchart showing a protection logic sequence of a method for staged controlled shutdown of an electric propulsion unit in response to the power switch short-circuit fault scenario depicted in FIG. 14.

Instead of invoking the SSO mode for all inverters of motor controller 50 in response to the power switch short-circuit fault 7, this disclosure proposes a staged controlled shutdown into Safe mode. FIG. 15 is a flowchart showing a protection logic sequence of a method 100a for staged controlled shutdown of an electric propulsion unit in accordance with one embodiment. First, the protection logic is configured to determine whether the short-circuited power switch is part of the upper row of power switches 15a or the lower row of power switches 15b in response to detection of the power switch short-circuit fault 7. Then, ASC is commanded for the other two power switches in the same row (step 102a). On the one hand, if a power switch in the upper row of power switches 15a failed short, then the other two power switches 15a in the upper row are commanded to transition from the Open state to the Closed state. On the other hand, if a power switch in the lower row of power switches 15b failed short, then the other two power switches 15b in the lower row are commanded to transition from the Open state to the Closed state. The result is that the protection function shorts out the motor 30 and causes the motor 30 to start braking. Second, the battery contactors 48 are commanded to open (step 104). When battery contactors 48 are confirmed to be in an Open state, the DC link capacitors 40 in all healthy channels of the motor controller 50 are discharged by commanding a large direct current $I_d$ (step 106), sending a large direct current $I_d$ to the motor 30. Unlike the quadrature current $I_q$ that generates torque in the motor 30, the direct current $I_d$ does not generate torque but instead generates energy that is used to reduce the field of the permanent magnets in the rotor 28. This allows for quick discharging of the DC link capacitors 40 within a few milliseconds. There are alternative ways for discharging the DC link capacitor which are detailed in FIGS. 19 and 21 (discussed in some detail below). Finally, when the DC link capacitors 40 in front of the unfaulted inverters have been discharged, all switches in each inverter of the motor controller 50 which remain open are commanded to close (step 108). This allows for quick braking of the motor 30 that minimizes the duration of the unsafe condition with large torque and current ripple. Discharging the DC link capacitors 40 is necessary for safe handling of failed equipment by personnel in subsequent maintenance operations on the ground.

It is important to distinguish what type of fault is detected and at which location. It is possible to do because each failure has its own specific signature. The motor controller 50 can monitor all necessary signals (input and output DC and AC voltages and currents, motor speed, rotor position, calculate motor torque, etc.) and differentiate which type of fault is detected. Depending on that determination, the "Safe State Mode" is selected to be either short circuiting or opening of the power switches in the faulty motor controller channel.

One common fault that may occur in stator windings of an AC motor is a turn-to-turn fault. This occurs when the insulation between two turns in the same stator winding (coil) breaks down and produces a short circuit. Another fault that can occur with stator windings is a phase-to-phase fault. This results from the insulation breaking down between two separate phases, usually lying adjacent to each other in the same slot. A three-phase fault is a condition wherein three star-connected stator windings are short circuited.

Figure 16:
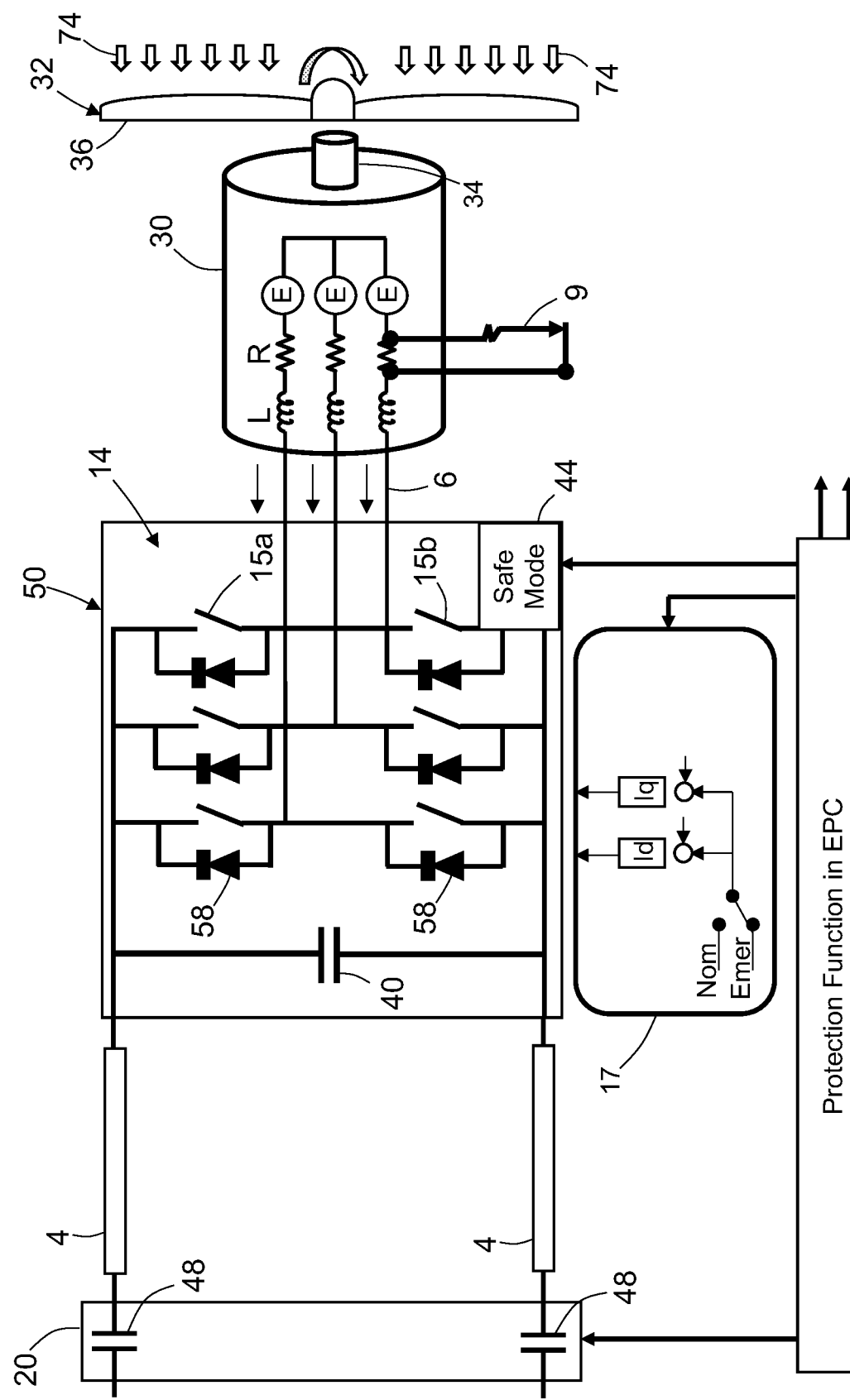
FIG. 16 is a diagram showing components of a protection system in accordance with a first embodiment which is configured to take protective action to ameliorate the consequences of a turn-to-turn fault in a stator winding of a 3-phase AC motor.

FIG. 16 is a diagram showing components of a protection system in accordance with a first embodiment which is configured to take protective action to ameliorate the consequences of a turn-to-turn fault 9 in a stator winding of a 3-phase AC motor 30. The protection system shown in FIG. 16 is different from the protection system depicted in FIG. 14 only in that instead of discharging the DC link capacitors 40 in only the unfaulted inverters, the DC link capacitors 40 in all inverters are discharged by commanding a large direct current $I_d$. The same response is also invoked when a motor phase-to-phase fault or a motor 3-phase fault occurs.

FIG. 17 is a flowchart showing the protection logic sequence of a method 100b used by the protection system depicted in FIG. 16 for staged controlled shutdown of an electric propulsion unit in response to a turn-to-turn fault 9 in a stator winding. First, the protection logic is configured to determine whether a turn-to-turn fault 9 in the motor 30 has occurred. Then, the ASC is commanded for three power switches in the same row (upper or lower) of each inverter (step 102). The result is that the protection function shorts out the motor 30 and causes the motor 30 to start braking. Second, the battery contactors 48 are commanded to open (step 104). When battery contactors 48 are confirmed to be in an Open state, the DC link capacitors 40 in all channels of the motor controller 50 are discharged by commanding a large direct current $I_d$ demand (step 106). Finally, when the DC link capacitors 40 in all channels have been discharged, all switches in each inverter 14 of the motor controller 50 which remain open are commanded to close (step 108). When the SSC condition exists, the motor and motor controller are in a safe operating mode 44. This allows for quick braking of the motor 30 that minimizes the duration of the unsafe condition with large torque and current ripple. Discharging the DC link capacitors 40 is also necessary for safe handling of failed equipment by personnel in subsequent maintenance operations on the ground.

Figure 18:
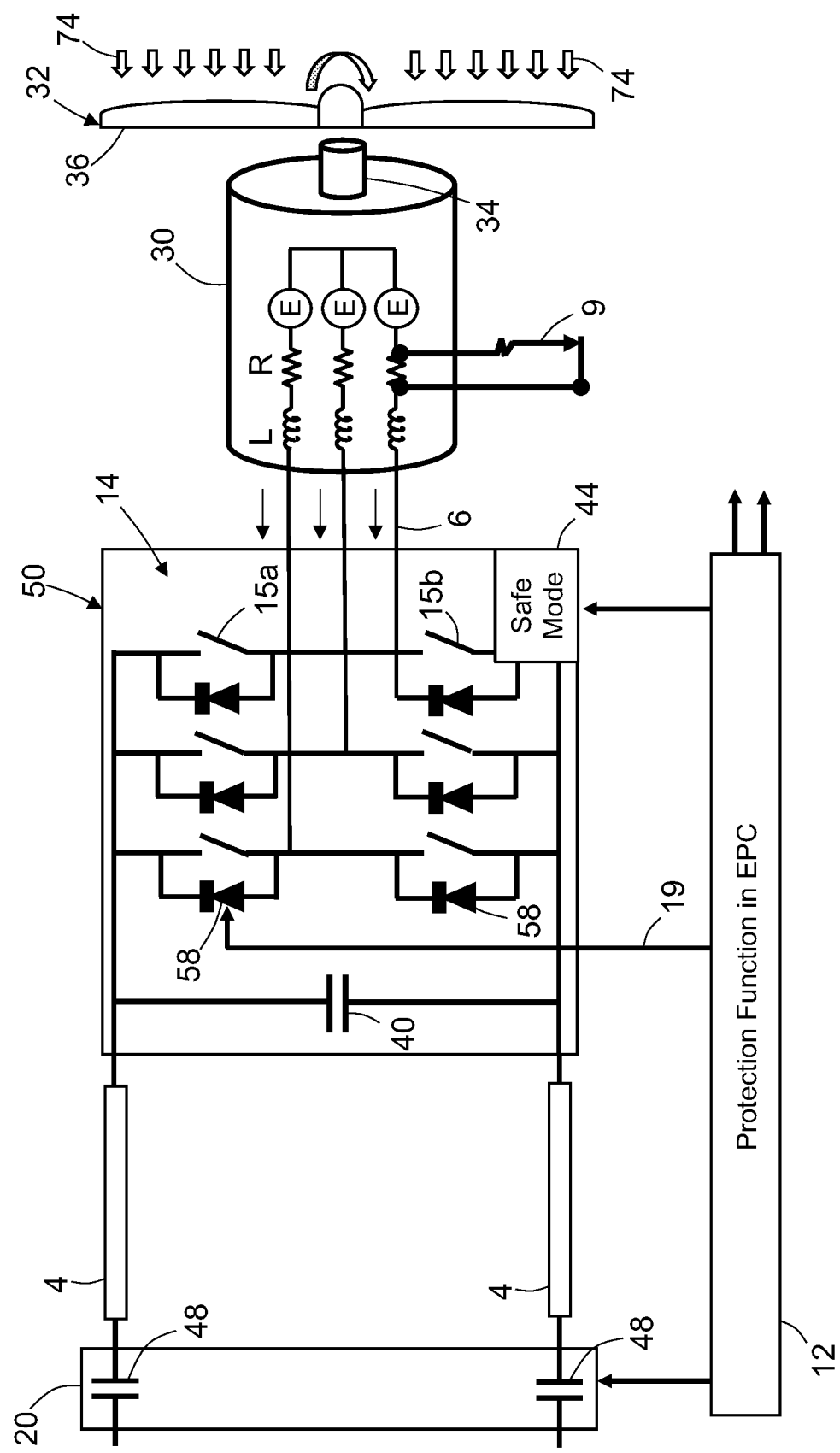
FIG. 18 is a diagram showing components of a protection system in accordance with a second embodiment which is configured to take protective action to ameliorate the consequences of a turn-to-turn fault in a stator winding of a 3-phase AC motor.

FIG. 18 is a diagram showing components of a protection system in accordance with a second embodiment which is configured to take protective action to ameliorate the consequences of a turn-to-turn fault 9 in a stator winding of a 3-phase AC motor 30. The protection system shown in FIG. 18 is different from the protection system depicted in FIG. 16 only in that instead of discharging the DC link capacitors 40 by commanding a large direct current $I_d$, the protection system is configured to discharge the DC link capacitors 40 by placing the three power switches in the other (not short-circuited) row of power switches in a linear mode. The chain of control signals from the electric propulsion controller 12 to the engine control unit (not shown in FIG. 18) and then from the engine control unit to the inverter controller (not shown in FIG. 18) is indicated by arrow 19. (Arrow 19 does not represent a signal sent directly from the electric propulsion controller 12 to the inverter; such direct communication does not occur.) The same response is also invoked when a motor phase-to-phase fault or a motor 3-phase fault occurs.

The sequence of control signals (including switch state commands) represented by arrow 19 in FIG. 18 places the upper row of power switches 15a in a linear mode (this assumes that the lower row of power switches have already been short-circuited). Normally, power electronics switches are operated in Closed or Open modes. In the linear mode, the power switch is neither Closed nor Open, but rather is in an in-between state. When the power switch is Open, its resistance is very large and there is no current flowing through the switch. When the power switch is Closed, its resistance is very small and there is large current flowing through the switch. In the linear mode, the resistance of the switch has a value between the values of the very large and very small resistances while the power switch is in a half-closed or half-open position. This condition of the switch can be achieved by applying a specific voltage signal to the gate of the switch. The advantage of using the linear mode for discharging the DC link capacitor 40 is that the capacitor discharge current can be controlled by controlling switch resistance in the linear mode. If the power switches were commanded to transition to the (fully) Closed state when discharging the capacitor, this would result in a very large discharge current that may overheat and impair the capacitor. By using controlled current discharge of the DC link capacitor 40, discharge current is limited and capacitor heating as also limited and extended over some time.

Figure 19:
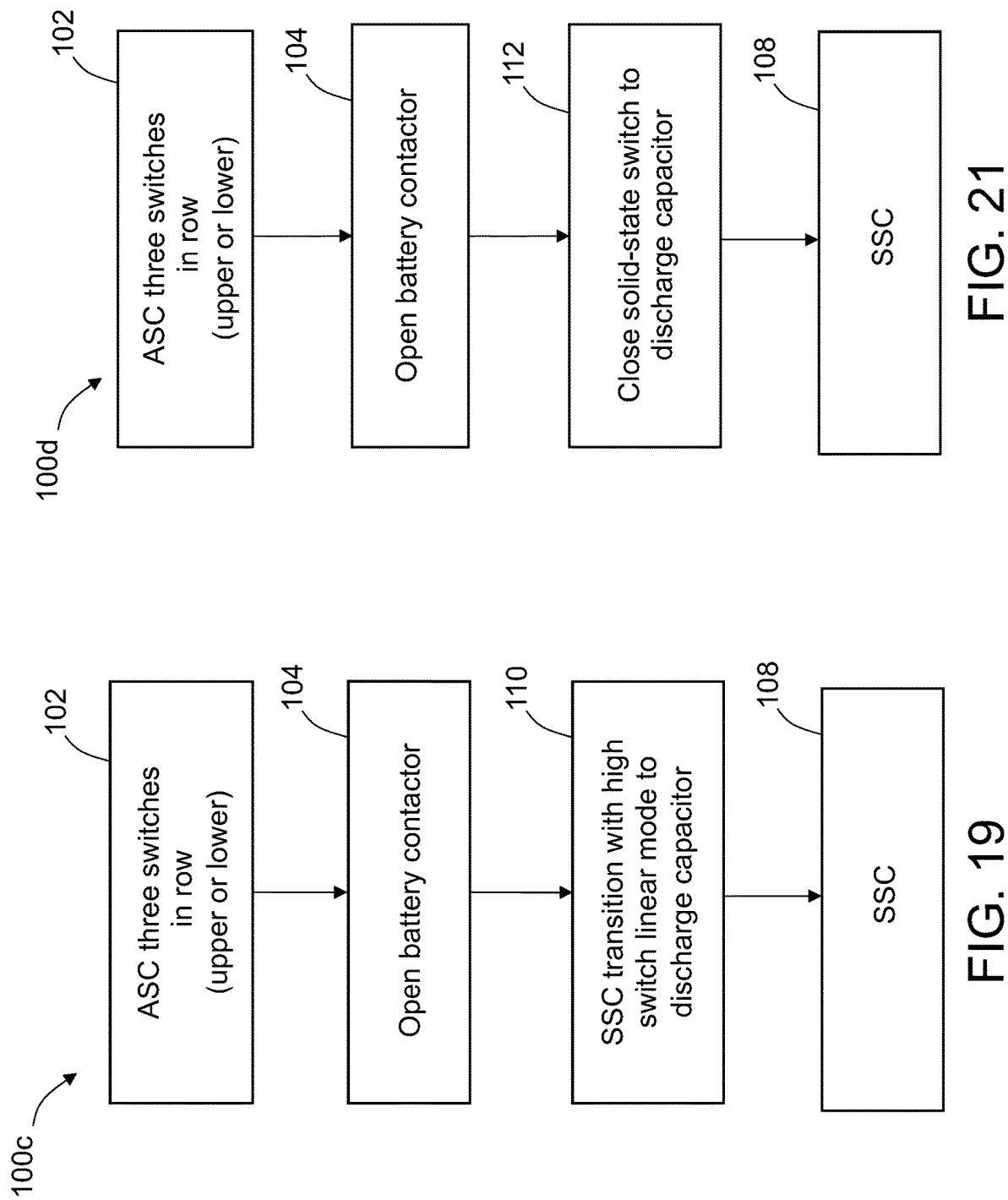
FIG. 19 is a flowchart showing the protection logic sequence used by the protection system depicted in FIG. 18 for staged controlled shutdown of an electric propulsion unit in response to a turn-to-turn fault in a stator winding.

FIG. 19 is a flowchart showing the protection logic sequence of a method 100c used by the protection system depicted in FIG. 18 for staged controlled shutdown of an electric propulsion unit in response to a turn-to-turn fault 9 in a stator winding. First, the protection logic is configured to determine whether a turn-to-turn fault 9 in the motor 30 has occurred. Then, the ASC is commanded for three power switches in the same row (upper or lower) of each inverter (step 102). Second, the battery contactors 48 are commanded to open (step 104). When battery contactors 48 are confirmed to be in an Open state, but with a voltage below a maximum allowable value, the DC link capacitors 40 in all channels of the motor controller 50 are discharged by placing three power switches in either the upper or low row in a linear mode (step 110). Thus, the DC link capacitor 40 is discharged by placing three switches in one row in the linear mode, while the three switches in the other row are used to short circuit the motor 30. Finally, when the DC link capacitors 40 in all inverters have been discharged, all switches in each inverter 14 which remain open are commanded to close (step 108).

Figure 20:
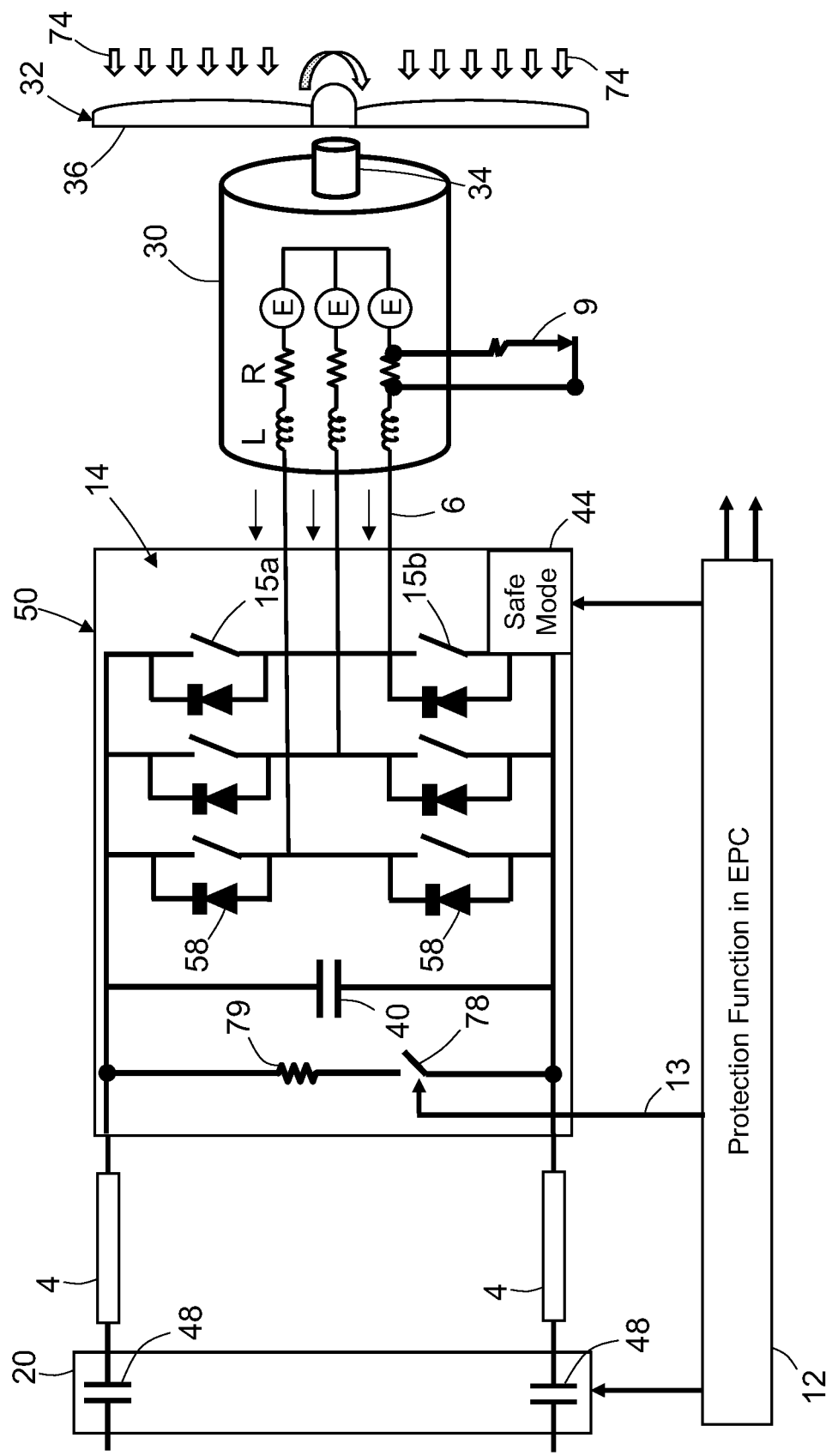
FIG. 20 is a diagram showing components of a protection system in accordance with a third embodiment which is configured to take protective action to ameliorate the consequences of a turn-to-turn fault in a stator winding of a 3-phase AC motor.

FIG. 20 is a diagram showing components of a protection system in accordance with a third embodiment which is configured to take protective action to ameliorate the consequences of a turn-to-turn fault 9 in a stator winding of a 3-phase AC motor 30. Each channel of the motor controller 50 includes a discharge resistor 79 connected in series with a solid-state switch 78, which series-connected elements are connected in parallel with the DC link capacitor 40. In this example, the DC link capacitors 40 are discharged commanding the solid-state switch 78 to close. The chain of control signals from the electric propulsion controller 12 to the engine control unit (not shown in FIG. 18) and then from the engine control unit to the drive circuit (not shown in FIG. 18) for the solid-state switch 78 is indicated by arrow 13. (Arrow 13 does not represent a signal sent directly from the electric propulsion controller 12 to the front-end circuitry.)

The same response is also invoked when a motor phase-to-phase fault or a motor 3-phase fault occurs.

FIG. 21 is a flowchart showing the protection logic sequence of a method 100d used by the protection system depicted in FIG. 20 for staged controlled shutdown of an electric propulsion unit in response to a turn-to-turn fault 9 in a stator winding. First, the protection logic is configured to determine whether a turn-to-turn fault 9 in the motor 30 has occurred. Then, the ASC is commanded for three power switches in the same row (upper or lower) of each inverter (step 102). Second, the battery contactors 48 are commanded to open (step 104). When battery contactors 48 are confirmed to be in an Open state, the DC link capacitor 40 in each channel of the motor controller 50 is discharged by the discharge resistor 79 in response to closure of the solid-state switch 79 (step 112). After the DC link capacitors 40 have been discharged, all switches in each inverter 14 which remain open are commanded to close (step 108).

Another possible abnormal condition in the motor controller 50 is when a power switch fails open. Results of a computer simulation showed that a power switch open fault results in large amount of DC content in the motor current, which is normally AC, which gives rise to large motor current imbalance or large DC link current ripple. Therefore, the detection (sensing) of a power switch open fault may be based on the presence of these characteristics or a combination of these characteristics. The computer simulation showed no significant impact on motor speed and torque during a power switch open fault condition.

If a power switch fails open, the switch cannot be controlled to transition from the Open state to the Closed state and always remains in the Open state. The effects of this fault are twofold. First, the motor phase currents $I_a$, $I_b$, and $I_c$ will have a high DC content. Normally, motor currents are close to sinusoidal AC currents, but if one switch stays open, these AC currents will be shifted up and down and will have a DC component. In addition, at DC input, since there are multiple inverters and multiple DC link capacitors, there will be circulating current between DC link capacitors at the input of the motor controllers.

Figure 22:
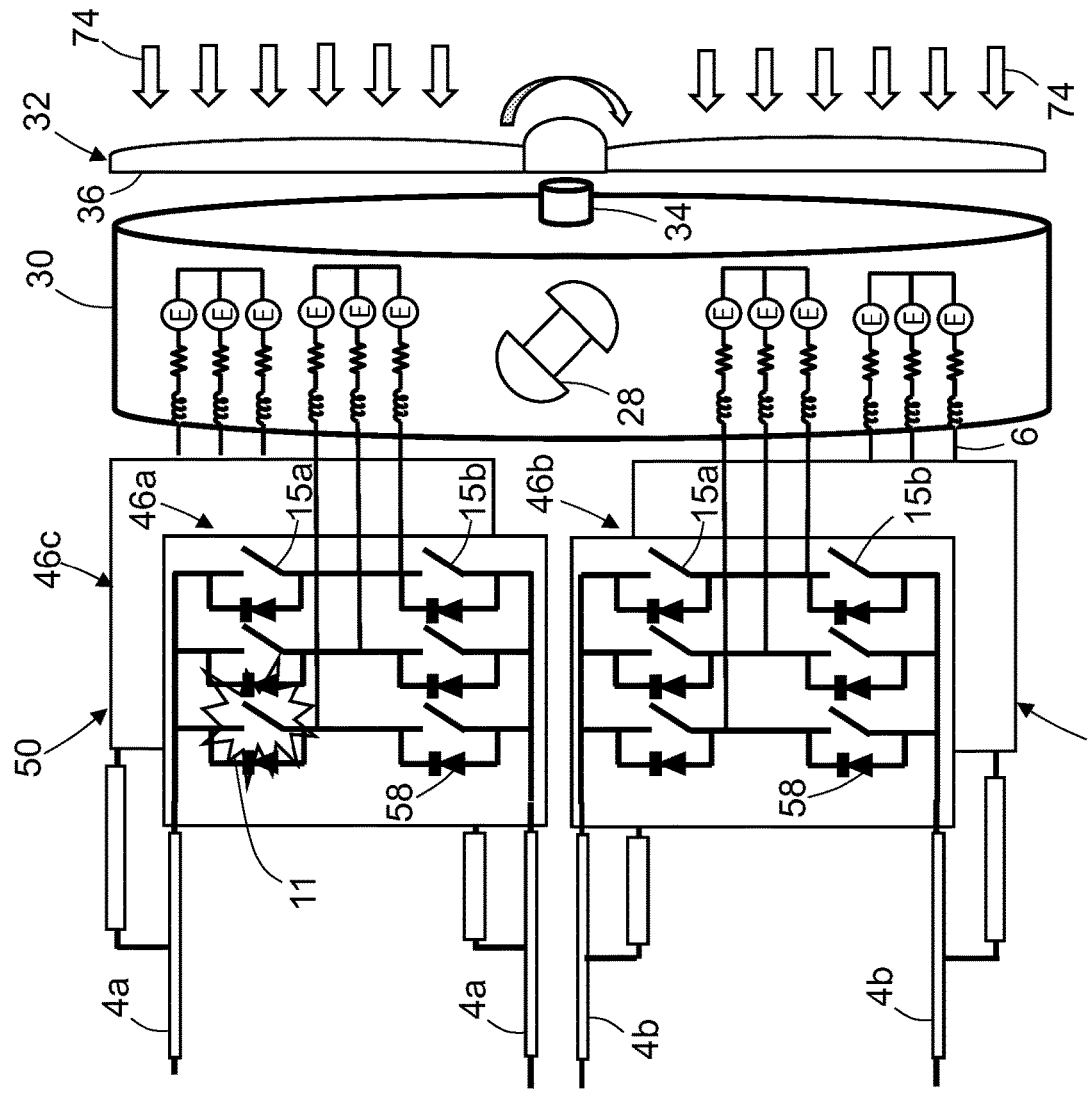
FIG. 22 is a diagram showing components of a protection system configured to take protective action to ameliorate the consequences of a power switch open fault in an inverter of a motor controller.

FIG. 22 is a diagram showing components of a protection system configured to take protective action to ameliorate the consequences of a power switch open fault 11 in an inverter 14 of a motor controller 50 in accordance with one embodiment. The system is configured with protection logic. In one proposed implementation, the protection logic is in the form of code which a processor executes to perform a protection control algorithm. The power switch open fault 11 can be detected as described above by the presence of a large DC content in the motor current, a large imbalance in motor phase currents, a large DC current ripple, or a combination of these conditions. The protection clearing logic invoked then depends on the operating condition of the electric propulsion system when the fault occurred. More specifically, if the fault occurred during a field weakening operation, i.e., when a large amount of $I_d$ current was injected into the motor 30, then the final step in the protection sequence is ASC of all switches in the inverter. If the fault occurred without field weakening—when $I_d$ current was not injected—then the final step in the protection sequence should be SSO (six switches open) in the motor controller 50.

Field weakening is used when it is necessary to maintain the nominal operating speed of the motor 30, when the DC link voltage is relatively low. Motor speed is proportional to the voltage provided by the motor controller 50. The higher the motor speed, the higher will be the back electromotive force (EMF) generated by the motor 30. For the motor controller 50 to be able to drive the motor 30 at a specific speed, motor controller 50 should provide voltage to the motor 30 that is greater than the voltage generated by the motor back EMF. However, when the DC link voltage is low, motor controller 50 cannot overcome the voltage generated by the motor back EMF. In this case the speed of the motor 30 will drop unless the field weakening motor control technique is employed. In motor field-oriented control, the $I_q$ motor current component is generating torque, while the $I_d$ component is generating motor voltage that effectively reduces the magnetic field and therefore, reduces the back EMF generated by the spinning motor. Therefore, normally, when the DC link voltage is high enough, it is more efficient to set the reference point for the $I_d$ current in motor controller 50 to zero, and use the full available motor controller current as the $I_q$ component to extract maximum available torque from the motor 30. However, when the DC link voltage is low and it is necessary to maintain motor speed, $I_d$ current can be injected to reduce motor back EMF to allow operation under a low DC voltage condition. $I_q$ current is also injected under this condition, but typically at a reduced level, since the portion of total available current is used to enable the motor 30 to maintain its speed and not for torque generation. It is also possible to oversize the motor controller current capability to deliver full torque during field weakening operation.

When the motor 30 is driven in the field weakening region, i.e., when the DC link voltage is low, $I_d$ current is injected to reduce and to keep the motor back EMF at a low level, and if at this time the motor controller 50 suddenly stops operation and adopts the SSO condition, $I_d$ current is no longer injected into the motor 30. Under this condition, since the motor 30 continues to spin at the same speed and at this point there is nothing to counteract the generated motor back EMF ($I_d$ current is zero), the motor back EMF suddenly increases. The regenerated voltage is then rectified through the freewheeling diodes 58 of the motor controller 50 and the resulting voltage is significantly higher than the DC link voltage provided by the battery 18. When this happens, the motor 30 regenerates power back to the battery 18 uncontrollably. Since the battery 18 is a low-impedance source and the regenerated power is significant, the result is a large current flowing back to the battery 18. This current can be much greater than the battery nominal charging current. This undesirable condition may lead to battery over-charge and subsequent over-heating and thermal runaway. Thus, during a field weakening operation, the SSO strategy for the motor controller 50 cannot be used. Instead, ASC should be utilized, so that the motor 30 is short circuited and regenerated current circulates in the motor 30 and motor controller 50 only. However, when the motor 30 is not in a field weakening operational mode, it is better to employ the SSO strategy, which is less harmful to the battery 18. Also, the SSO strategy does not create additional braking drag on the electric propulsion system as is the case when ASC is employed.

Figure 23:
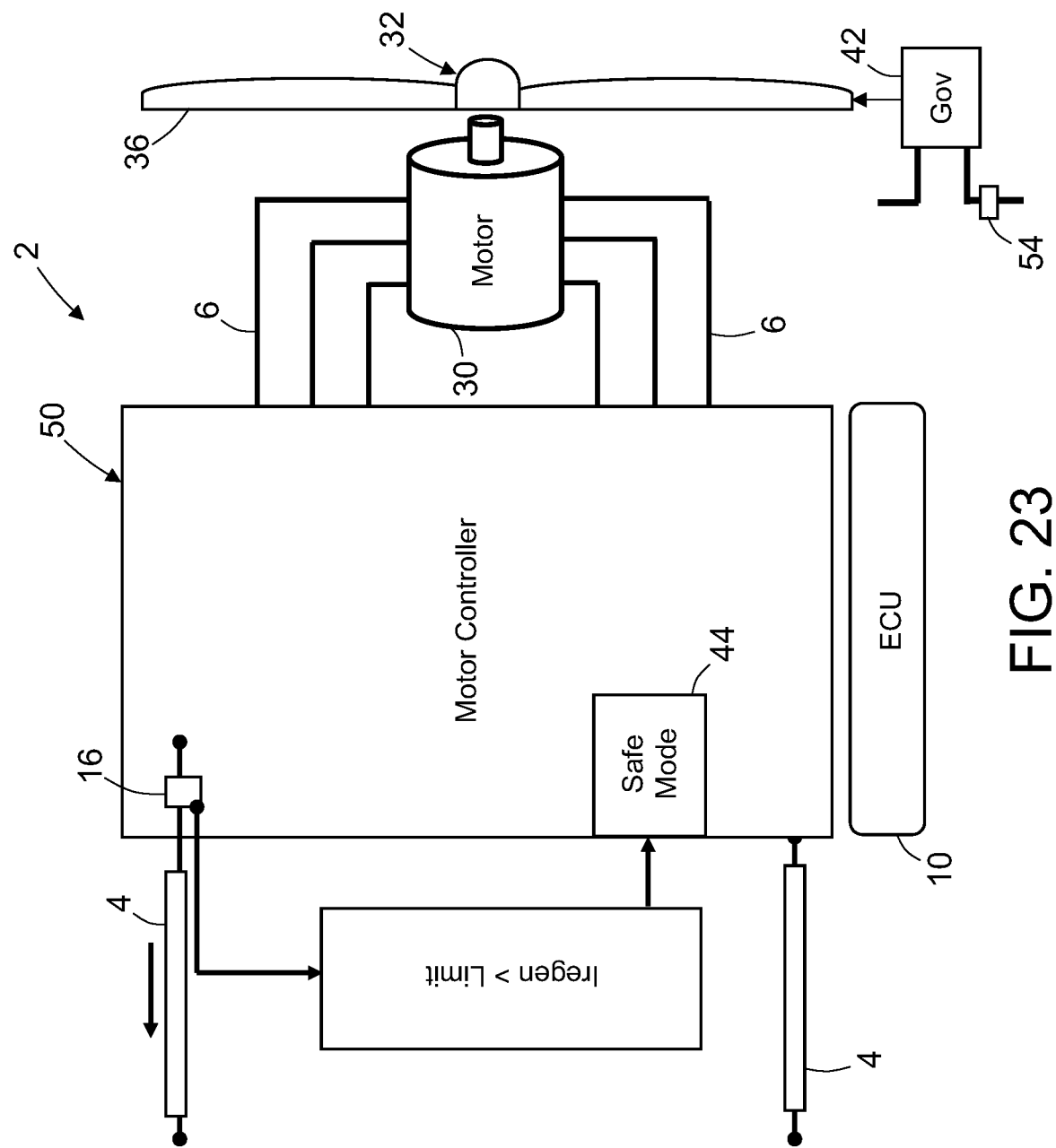
FIG. 23 is a diagram showing the protection logic for ameliorating the consequences of the power switch open fault depicted in FIG. 22 in accordance with one embodiment.

FIG. 23 is a diagram showing the protection logic for ameliorating the consequences of the power switch open fault 11 depicted in FIG. 22 in accordance with one embodiment. The safe mode 44 is invoked if the regenerated current $I_{regen}$ is greater than a limit current. If not in a field weakening operation region, the motor controller 50 is commanded to transition to the SSO mode and the electric propulsion system can continue degraded electric propulsion motor operation rather than command complete system shutdown. If the motor 30 is being operated in a field weakening mode, the motor controller 50 is commanded to an ASC mode that closes one row of three switches in the inverter when the other row of three switches has a power switch open fault. Then the battery contactors 48 are commanded to open and the DC link capacitor 40 is discharged using one of the techniques discussed above and shown in FIGS. 16-21. In the final step, the motor controller 50 in an ASC mode commands all healthy (no open fault) switches of the inverter to close.

While systems and methods for protecting an airplane electric propulsion motor drive system have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The electric propulsion controller and engine control unit (a.k.a. engine controller) disclosed herein may be implemented using hardware or hardware in combination with software. For example, a controller may be implemented using configurable hardware, a programmable device, or both. Configurable hardware may comprise hardware that is configurable to perform one or more functions of the controller. A programmable device may comprise any device that is programmable to implement one or more functions of the controller. For example, without limitation, the programmable device may comprise a central processing unit, a microprocessor, or a digital signal processor. The programmable device may be configured to run software or firmware in the form of program instructions to implement one or more functions of the controller. Program instructions may be stored in any appropriate non-transitory tangible computer-readable storage medium for execution by, or transfer to, the programmable device.

As used in the claims, the term "control system" includes one or more controllers. For example, a control system may include an electric propulsion controller, an engine control unit, and a plurality of inverter controllers.

The methods described herein may be include steps encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The invention claimed is:

1. A method for protecting an electric propulsion system in response to occurrence of a fault, the method comprising:
   activating short circuits in power switches of inverters in a motor controller to redirect current regenerated by a motor which is electrically coupled to the motor controller and mechanically coupled to a propeller;
   feathering the propeller while the motor is regenerating current; and
   opening battery contactors to disconnect a battery from the motor controller,
   wherein the fault is a short circuit in one power switch in a row of power switches in one inverter, the method further comprising discharging a DC link capacitor in another inverter of the motor controller, and
   wherein activating short circuits in power switches comprises:
   closing other power switches in the row of power switches that includes the one power switch that is short circuited prior to opening the battery contactors; and
   closing all open power switches in the motor controller after the DC link capacitor has been discharged.

2. A method for protecting an electric propulsion system in response to occurrence of a fault, the method comprising:
   activating short circuits in power switches of inverters in a motor controller to redirect current regenerated by a motor which is electrically coupled to the motor controller and mechanically coupled to a propeller;
   feathering the propeller while the motor is regenerating current; and
   opening battery contactors to disconnect a battery from the motor controller,
   wherein the fault is a short circuit in a stator of the motor, the method further comprising discharging DC link capacitors in all inverters of the motor controller.

3. The method as recited in claim 2, wherein activating short circuits in power switches comprises:
   closing power switches in one row of power switches in each inverter prior to opening the battery contactors; and
   closing all open power switches in the motor controller after the DC link capacitors have been discharged.

4. A method for protecting an electric propulsion system in response to occurrence of a fault, the method comprising:
   activating short circuits in power switches of inverters in a motor controller to redirect current regenerated by a motor which is electrically coupled to the motor controller and mechanically coupled to a propeller;
   feathering the propeller while the motor is regenerating current; and
   opening battery contactors to disconnect a battery from the motor controller,
   wherein the fault is a DC bus fault, and activating short circuits in power switches comprises:
   closing power switches in one row of power switches in each inverter prior to opening the battery contactors; and
   closing all open power switches in the motor controller after the DC link capacitors have been discharged.

5. An electric propulsion unit comprising:
   a battery;
   a DC bus connected to receive DC power from the battery;
   a motor controller connected to receive DC power from the DC bus, the motor controller comprising a plurality of inverters;
   an AC motor connected to receive AC power from the motor controller;
   a propeller mechanically coupled to the AC motor, the propeller comprising propeller blades having adjustable pitch;
   a governor configured to adjust the pitch of the propeller blades during a feathering operation; and
   a control system configured to perform operations comprising:
   activating short circuits in power switches of the inverters in the motor controller to redirect current regenerated by the AC motor;
   activating the governor to feather the propeller while the motor is regenerating current; and
   activating opening of battery contactors to disconnect the battery from the motor controller.

6. The electric propulsion unit as recited in claim 5, wherein the control system is further configured to activate discharge of a DC link capacitor in an inverter of the motor controller.

7. The electric propulsion unit as recited in claim 6, wherein activating short circuits in power switches comprises:
    closing power switches in one row of power switches in each inverter prior to opening the battery contactors; and
    closing all open power switches in the motor controller after the DC link capacitor has been discharged.

8. A method for staged controlled shutdown of a motor controller that includes a plurality of inverters, the method comprising:
    (a) closing power switches in one row of power switches in each inverter of the motor controller;
    (b) opening battery contactors to disconnect a battery from the motor controller;
    (c) discharging a DC link capacitor in each inverter of the motor controller; and
    (d) closing all open power switches in the motor controller after the DC link capacitors have been discharged.

9. The method as recited in claim 8, wherein step (c) comprises commanding a large direct current $I_d$.

10. The method as recited in claim 8, wherein step (c) comprises placing power switches another row of power switches in the inverter in a linear mode.

11. The method as recited in claim 8, wherein step (c) comprises closing a solid-state switch that is connected in series to a discharge resistor that is connected in parallel with the DC link capacitor.

12. A method for protecting an electric propulsion system in response to a power switch open fault, the method comprising:
    (a) detecting the power switch open fault in one row in an inverter of a motor controller;
    (b) determining whether the power switch open fault occurred during a field weakening operation or not; and
    (c) taking protective action in dependence on the determination made in step (b).

13. The method as recited in claim 12, wherein step (c) comprises opening other power switches in the inverter if the power switch open fault did not occur during a field weakening operation.

14. The method as recited in claim 12, wherein if the power switch open fault occurred during a field weakening operation, then step claim (c) comprises:
    closing power switches in another row of the inverter;
    opening battery contactors to disconnect a battery from the motor controller;
    discharging a DC link capacitor in the inverter; and
    closing all power switches in the one row after the DC link capacitor has been discharged.

15. The method as recited in claim 14, wherein step (a) comprises detecting a large DC content in a motor current, a large imbalance in motor phase currents, a large DC current ripple, or a combination of these conditions.

16. An electric propulsion unit comprising:
    a battery;
    a DC bus connected to receive DC power from the battery;
    a motor controller connected to receive DC power from the DC bus;
    an AC motor connected to receive AC power from the motor controller;
    a propeller mechanically coupled to the AC motor; and
    a control system configured to perform operations comprising:
    (a) detecting a power switch open fault in one row in an inverter of the motor controller;
    (b) determining whether the power switch open fault occurred during a field weakening operation or not; and
    (c) taking protective action in dependence on the determination made in step (b).

17. The electric propulsion system as recited in claim 16, wherein step (a) comprises detecting a large DC content in a motor current.

18. The electric propulsion system as recited in claim 16, wherein step (a) comprises detecting a large imbalance in motor phase currents.

19. The electric propulsion system as recited in claim 16, wherein step (a) comprises detecting a large DC current ripple.

20. The electric propulsion system as recited in claim 16, wherein the protective action comprises commanding the motor controller to an active short circuit mode that closes one row of three power switches in an inverter when another row of three power switches has a power switch open fault if the AC motor is being operated in a field weakening mode.

* * * * *